(12) United States Patent
Taylor et al.

(10) Patent No.: US 8,074,434 B2
(45) Date of Patent: Dec. 13, 2011

(54) CONTINUOUS LONGITUDINAL FLOW ROOT CROP HARVESTING

(75) Inventors: Howard W. Taylor, Armstrong, IA (US); Charles B. Bauer, Reese, MI (US); Wayne A. Vogel, Holton, MI (US)

(73) Assignee: Art's-Way Manufacturing Co., Armstrong, IA (US)

( * ) Notice: Subject to any disclaimer, the term of this patent is extended or adjusted under 35 U.S.C. 154(b) by 1348 days.

(21) Appl. No.: 11/615,658

(22) Filed: Dec. 22, 2006

(65) Prior Publication Data

US 2007/0181315 A1    Aug. 9, 2007

Related U.S. Application Data

(62) Division of application No. 11/001,759, filed on Dec. 2, 2004, now Pat. No. 7,165,628.

(60) Provisional application No. 60/551,512, filed on Mar. 9, 2004.

(51) Int. Cl.
*A01D 51/00* (2006.01)

(52) U.S. Cl. .............................. 56/62; 171/58; 171/129

(58) Field of Classification Search ..................... 171/58, 171/129; 56/62
See application file for complete search history.

(56) References Cited

U.S. PATENT DOCUMENTS

| | | | |
|---|---|---|---|
| 2,331,520 A | 10/1943 | Urschel | |
| 2,588,764 A | 3/1952 | Richmond | |
| 2,944,611 A | 7/1960 | Rollins | |
| 3,010,522 A | 11/1961 | Oppel | |
| 3,181,616 A | 5/1965 | Oppel | |
| 3,654,997 A | 4/1972 | Partyanko et al. | |
| 3,673,774 A | 7/1972 | Mizzi | |
| 3,952,828 A | 4/1976 | Stampfer et al. | |
| 3,972,381 A | 8/1976 | Gail | |
| 3,991,618 A | 11/1976 | Stampfer et al. | |

(Continued)

FOREIGN PATENT DOCUMENTS

GB    2 033 717 A    5/1980

(Continued)

OTHER PUBLICATIONS

Model 690 Beet Harvestor, "High Capacity, Low Maintenance, More Productive" Brochure, by Art's-Way Manufacturing Co., Inc., circa 2002.

(Continued)

*Primary Examiner* — Thomas Will
*Assistant Examiner* — Joel Mitchell
(74) *Attorney, Agent, or Firm* — Cook Alex Ltd.

(57) ABSTRACT

A harvester for root crops such as beets is provided which preferably provides continuous flow of root crops from a header, along a transfer assembly, through a processing run, and to an elevator assembly. The harvester can be configured to include or accommodate interchangeable header assemblies having different numbers of rows and/or row spacings. The transfer assembly can be of a floating type and helps to provide an even distribution of beets to the grabrollers. The processing run includes full-length cleaning grabrollers disposed parallel to the direction of travel. Modular elevator assemblies can be provided to further enhance harvester versatility. Such an approach includes interchangeable ferris wheel and scrubber chain elevator assemblies. An improved scrubber chain elevator assembly can be used which has a wraparound scrubber chain design. A pivoting tank conveyor for evenly filling a holding tank can be included. Large diameter carrier wheels on a single axle positioned for improved balance, flotation, and maneuverability typically are important basic characteristics of the harvesters.

2 Claims, 21 Drawing Sheets

U.S. PATENT DOCUMENTS

| | | | |
|---|---|---|---|
| 3,999,613 | A | 12/1976 | Porter |
| 4,024,920 | A | 5/1977 | Haverdink |
| 4,044,837 | A | 8/1977 | Haverdink |
| 4,049,058 | A | 9/1977 | Eisenhardt et al. |
| 4,116,279 | A | 9/1978 | Kilburn |
| 4,120,363 | A | 10/1978 | Ernst |
| 4,123,081 | A | 10/1978 | Ellinger |
| 4,137,973 | A | 2/1979 | Schwitters |
| 4,156,465 | A | 5/1979 | Porter |
| 4,166,351 | A | 9/1979 | Nienberg |
| 4,184,550 | A | 1/1980 | Ammermann |
| 4,192,386 | A | 3/1980 | Haverdink et al. |
| 4,197,916 | A | 4/1980 | Haverdink et al. |
| 4,226,566 | A | 10/1980 | Maust |
| 4,382,471 | A | 5/1983 | Peterson |
| 4,416,334 | A * | 11/1983 | Bouillon ..................... 171/27 |
| 4,448,257 | A | 5/1984 | McRae |
| 4,453,373 | A | 6/1984 | De Coene |
| 4,627,226 | A | 12/1986 | De Coene |
| 4,691,506 | A | 9/1987 | Schwitters |
| 4,699,218 | A | 10/1987 | Schwitters |
| 4,753,296 | A | 6/1988 | Kruithoff |
| 4,798,248 | A | 1/1989 | Schwitters |
| 4,942,927 | A | 7/1990 | Halfmann |
| 4,971,155 | A | 11/1990 | Peturis |
| 4,993,695 | A | 2/1991 | Taylor et al. |
| 5,181,572 | A | 1/1993 | Andersen et al. |
| 5,197,550 | A | 3/1993 | Barnard |
| 5,372,546 | A | 12/1994 | Brakke |
| 5,387,155 | A | 2/1995 | Dietz |
| 5,463,856 | A | 11/1995 | Beckwith |
| 5,697,451 | A | 12/1997 | Nicholson |
| 6,168,671 | B1 | 1/2001 | Peterson et al. |
| 6,484,810 | B1 | 11/2002 | Bendix et al. |
| 6,988,559 | B2 | 1/2006 | Holy |
| 7,165,628 | B2 * | 1/2007 | Taylor et al. ................. 171/129 |
| 7,789,166 | B2 * | 9/2010 | Wallace .......................... 171/14 |
| 2004/0250523 | A1 | 12/2004 | Schulz |

FOREIGN PATENT DOCUMENTS

GB    2 215 972 A    10/1989

OTHER PUBLICATIONS

Model 2830 Beet Harvestor, "The Wheel Keeps on Digging" Brochure, by Art's-Way Manufacturing Co., Inc., circa 2002.
Model 680-B Beet Harvestor, "Tremendous Cleaning Ability From . . . The Hardworking Line", Brochure, by Arts-Way Manufacturing Co., Inc., circa 2002.
WIC Harvesters & Defoliators, Brochure, products of Amity Technology, 1998.
WIC Sugarbeet Harvesting Equipment, Brochure, products of Amity Technology, 1996.
WIC Dual Wheel Sugar Beet Harvester, "For maximum balance and minimum maintenance nothing "Beets" a WIC!", Brochure, by WIC, Inc., circa 2002.
WIC Sugarbeet Harvester, "Your Most Profitable Choice"—"When it Counts—Count on WIC", The WIC Harvester, Brochure, by WIC, Inc., circa 2002.
Sugar Beet Harvesters, Model 6-22 Lifter Loader and Model 6-22 Tank Harvester, Brochure, manufactured by Parma Company, 1989.
Sugar Beet Harvesters, Model M 904 Tank Harvester, Brochure, manufactured by Parma Company, 1989.
Parma Company, Sugar Beet Harvesters, "Let Over 25 Years of 6-Row Experience Work for You", Brochure, manufactured by Parma Company, 1989.
Parma, Sugar Beet 2010 Harvester, "The Simple Super Cleaner", Brochure, manufactured by Parma Company, circa 2002.
State of the Art Redefined, "Why does Parma set a new industry standard?", Brochure, by Parma Company, 1989.
Parma, Sugar Beet 910 Harvester, ""The" Lifter Loader With a Tank", Brochure, manufactured by Parma Company, circa 2002.
Parma, Model 900, "The Industry Standard"—"Still the Cleanest Elevating System on the Market", Brochure, manufactured by Parma Company, circa 2002.
Red River, Beet Harvester, "A well-engineered and reliable beet harvester", Brochure, by Red River Service Mfg., Inc., 1988.
"Interesting facts you should know about the 1992 Red River Sugar Beet Harvester", Information Sheet, by Red River Service Center, Inc., 1992.
"Introducing: The New Red River Beet Harvester", Brochure, by Red River, 1992.
Red River Wil—Rich, "Wide Frame Sugarbeet Harvester—Simple, Proven, Reliable!", Brochure, by Red River Wil—Rich, a division of TIC United Corp., 1997.
Red River Wil—Rich, "Rear Wheel Beet Harvester—Simple, Proven, Reliable!", Brochure, by Red River Wil—Rich, a division of TIC United Corp., 1997.
Alloway Sugar Beet Tools, "Harvesters, Defoliators, Cultivators and Shredders for the Sugar Beet Grower", Booklet, by Woods Equipment Company, 1996.
John Deere, Beet Equipment, Booklet, by John Deere; A-21-85-10 Litho in U.S.A., 1985.
John Deere, Beet Equipment, Booklet, by John Deere; A-21-81-01 Litho in U.S.A., 1981.
Lockwood, Sugar Beet Lifter-Loader, "Model 6300-11 Direct-Type Harvester Delivers Clean, Low Tare Beets Into Truck", Brochure, by Lockwood, Dealer: Pro AG Equipment, Inc. (00807-36B), 1989.
WIC Sugarbeet Harvester, "Your Most Profitable Choice"—"When It Counts—Count on WIC", The WIC 6-row Harvester, Brochure, by WIC, Inc., circa 2002.
A Total Sugarbeet Harvesting System, by Art's-Way Manufacturing Co., Inc., circa, not later than 2002.
698 Series Rear Wheel Harvester, by Art's-Way Manufacturing Co., Inc., circa, not later than 2002.
The Sugarbeet Grower Magazine, Webpage, 2 pages, Nov./Dec. 2003, dated Dec. 9, 2003.
Introducing the "New" 6812 Sugar Beet Harvester and Neuenfeldt, New Art's-Way Prototype Sugarbeet Harvester, http://www.michigansugar.com/agriculture/newsbeet/spring04.pdf, pp. 27 & 33, Spring 2004.
PCT International Search Report, International Application No. PCT/US2005/006996, mailed Jan. 24, 2006.

* cited by examiner

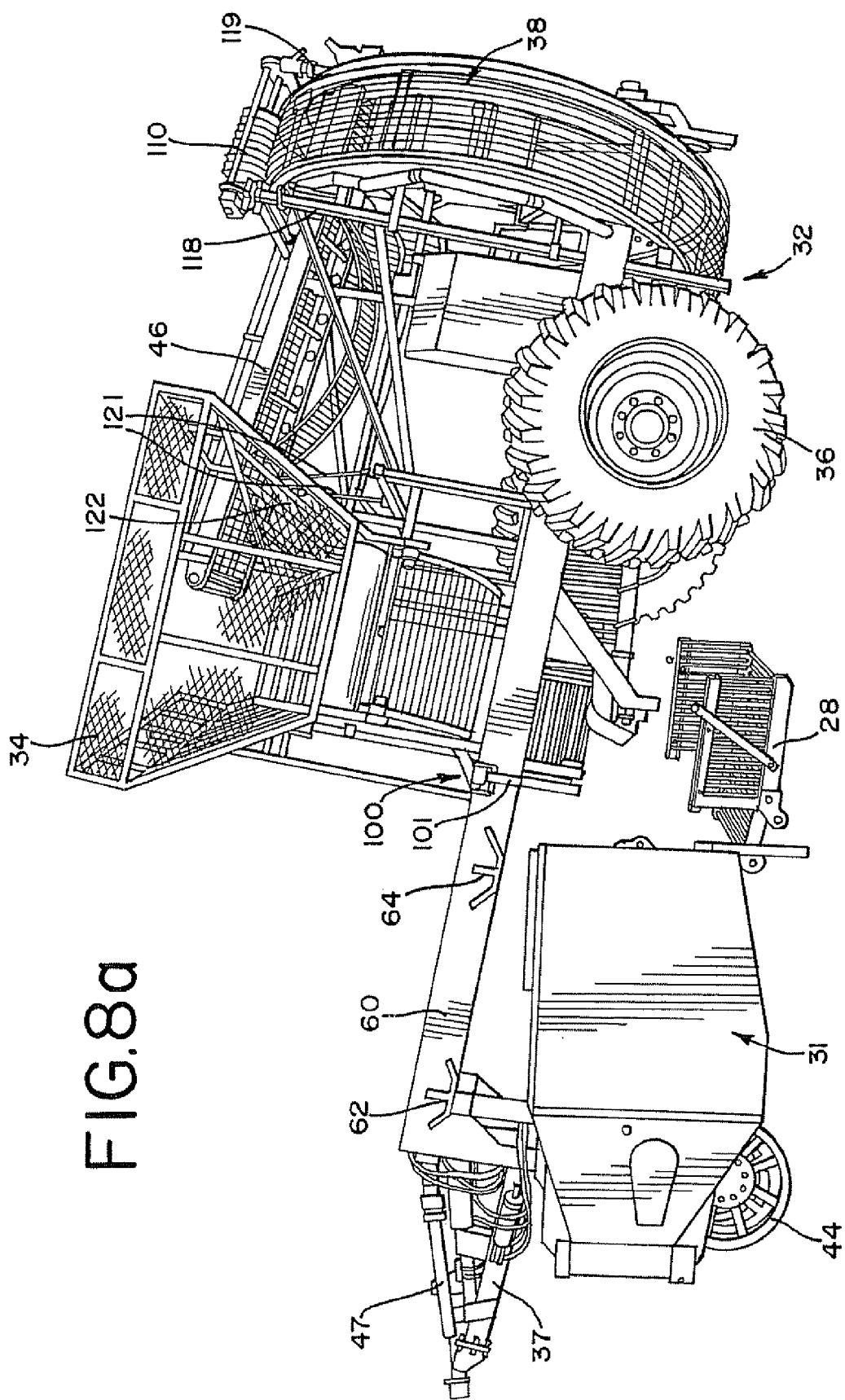

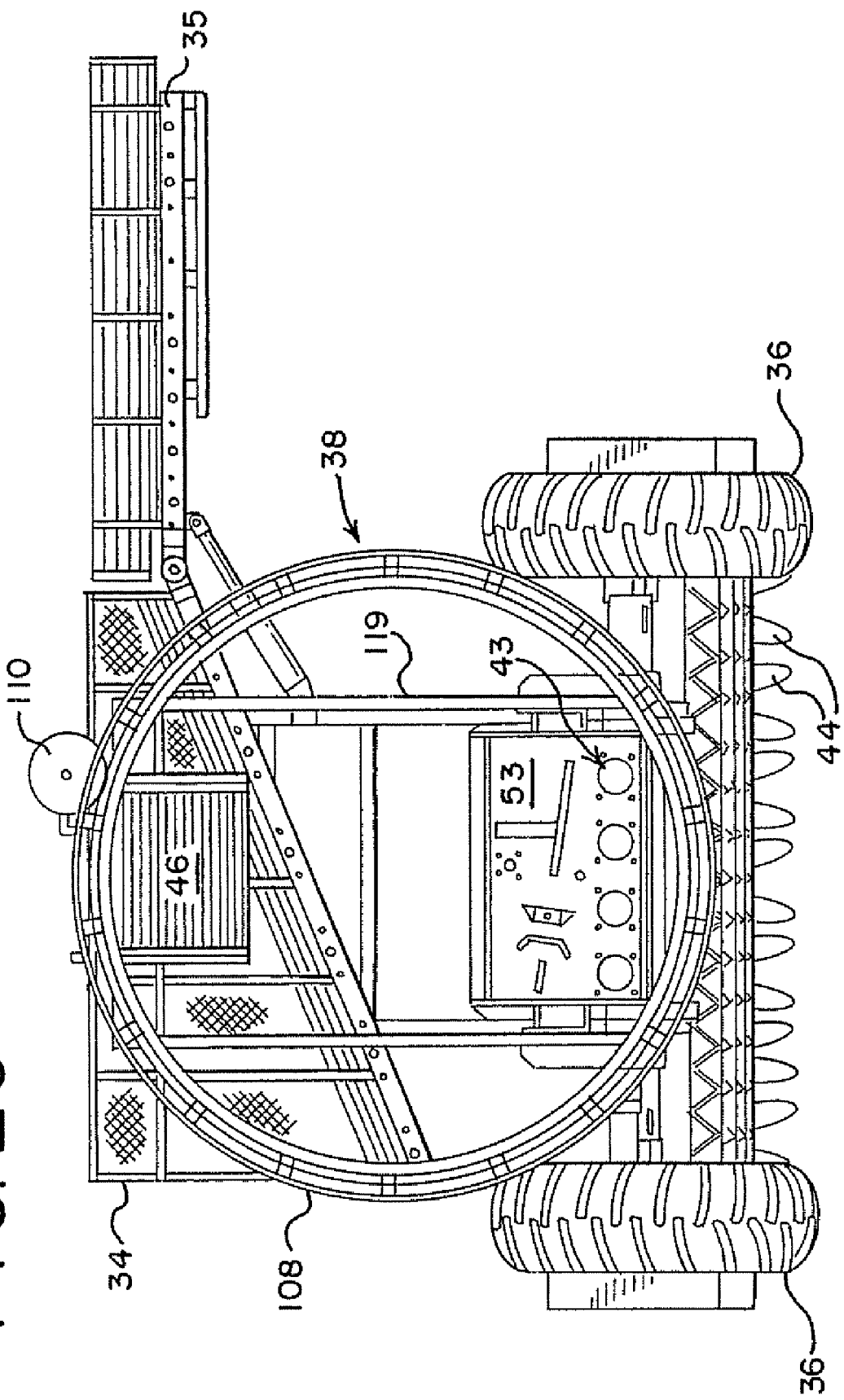

CONTINUOUS LONGITUDINAL FLOW ROOT CROP HARVESTING

CROSS REFERENCE TO RELATED APPLICATION

This application is a divisional of U.S. application Ser. No. 11/001,759, filed Dec. 2, 2004 now U.S. Pat. No. 7,165,628, which claims priority from and the benefit of Provisional Patent Application Ser. No. 60/551,512, filed Mar. 9, 2004, both hereby incorporated herein by reference.

BACKGROUND OF THE INVENTION

1. Field of the Invention

This invention generally relates to harvesters for and harvesting of crops that must be removed from the ground, more particularly, root crops such as beets.

2. Description of Related Art

Beet harvesters must be especially rugged and bulky in order to unearth sugarbeets and other root crops, with its attendant engagement with rocks and other obstacles along a typical beet harvesting path. Prior art beet harvester patents include U.S. Pats. No. 2,944,611 (Rollins), No. 3,010,522 (Oppel), No. 3,181,616 (Oppel), No. 4,116,279 (Kilburn), No. 4,137,973 (Schwitters), No. 4,184,550 (Ammermann), No. 4,226,566 (Maust), No. 4,382,471 (Peterson) and No. 4,633,956 (Glifberg). Prior art publications include those disclosing sugarbeet harvesters of Art's-Way Manufacturing Co., Inc., including "A Total Sugarbeet Harvesting System" brochure showing models of the 690 Series, the 692 Series and the 9420 Series, as well as a brochure entitled "698 Series Rear Wheel Harvester." These patents and publications are specifically incorporated by reference hereinto.

Heretofore, these types of harvesters typically have been constructed with a view toward meeting a specific harvesting need and under specific harvesting conditions. Crops, including beets, must be harvested with the same row spacing as they are planted. Typically, they also must be harvested with a harvester having a number of rows which is a multiple of the number of rows of the planter that had been used. Heretofore, these needs usually had been addressed by having to choose between having multiple harvesters available for use or using a harvester under conditions for which it might not have been strictly designed. Root crop harvesters also have been limited by size constraints and root crop processing difficulties from achieving improved root crop cleaning along the root crop flow path of the harvester.

Illustrated in FIG. 6a is a problem which the present invention has recognized and addressed. This problem, typically associated with prior art beet harvesters, is that they require the beets to change direction laterally along the cleaning flow path. Such harvesters have an assembly 20 that directs beets downstream to a bed of cleaning rollers 22, but then the beets must "turn the corner" and follow along the length of the transversally-disposed rollers 22. In connection with the invention, it has been determined that having the beets turn the corner hinders the cleaning function of the harvester, for example because mud and beets tend to accumulate along the area that the flow direction changes. This in turn makes it more difficult for the rollers to rotate and clean the beets. Also, with harvesters of the type shown in FIG. 6a, typically all beets do not engage the cleaning rollers 22 for the potential maximum length of travel, but for only a portion thereof.

Beet harvesters also are known to transfer harvested beets into position for collection using elevator type mechanisms. In essence, two basic structures are used. One is a so-called ferris wheel unit, and another is a scrubber chain unit. Traditionally, a beet harvester is configured with either a ferris wheel unit or a scrubber chain unit, and the user may not have the best unit for each harvesting situation. For example, it is generally understood that scrubber chain units are more aggressive than ferris wheel units and can be preferred over ferris wheel units in some situations. Some consider ferris wheel elevator units to operate in a more acceptable manner than a scrubber chain elevator for overall general harvesting situations. Flexibility in this regard could be beneficial by allowing the user to select the elevator type depending on field and weather conditions.

While a modular beet harvester was proposed in U.S. Pat. No. 4,197,916 (Haverdink, et al.), the design disclosed therein is plagued by a number of problems. For one, the proposed harvester has poor lateral balance because the elevator assembly is offset from the centerline. Also, the proposed harvester still requires the beets to turn the corner to travel from the cleaning rollers to the elevator assembly.

Accordingly, a general aspect and object of the present invention is to provide improved root crop harvesters suitable for harvesting beets and other in-ground crops.

Another aspect or object of the invention is to provide beet harvesters having modular design components.

Another aspect or object of the invention is to provide beet harvesters capable of simultaneously harvesting twelve rows of root crops.

Another aspect or object of the invention is to provide beet harvesters having continuous rearward flow from the transfer assembly to and into the elevator assembly.

Another aspect or object of this invention is to provide beet harvesters having a narrow-frame design and/or good maneuverability during use.

Another aspect or object of this invention is to provide a method of harvesting beets which more effectively cleans the beets by employing two cleaning roller beds that are oriented perpendicular to one another.

Another aspect or object of the invention is to provide beet harvesters having features such as an automatic adjustable rowfinder, heavy duty struts, and rugged paddle shaft assemblies.

Another aspect or object of the invention is to provide improved beet harvesters having multiple rollers that are freely adjustable and cushioned.

Another aspect or object of the invention is to provide improved beet harvesters having a header roller bed which assists in beet cleaning.

Another aspect or object of this invention is to provide beet harvesters having one or more points that utilize a controlled fall to clean the beets.

Another aspect or object of this invention is to provide beet harvesters having an easily-removable transfer assembly.

Another aspect or object of this invention is to provide beet harvesters having a transfer assembly that achieves some beet cleaning between a header and a grabroller assembly, which can include a manually-operated winch to quickly and easily remove the transfer assembly for cleaning and maintenance.

Another aspect or object of this invention is to provide beet harvesters with transverse rollers that combine with a transfer assembly to evenly distribute the beets onto a bed of grabrollers.

Another aspect or object of this invention is to provide beet harvesters having a cleaning bed with grabrollers oriented parallel to the rows and preferably including a single-point adjustment on front and back.

Another aspect or object of this invention is to provide beet harvesters which are more laterally balanced by having a rear-loading elevator, rather than a side-loading elevator.

Another aspect or object of this invention is to provide beet harvesters which can be fitted with either a ferris wheel elevator module or a scrubber chain elevator module.

Another aspect or object of this invention is to provide beet harvesters having an improved wraparound scrubber chain elevator assembly.

Another aspect or object of this invention is to provide beet harvesters having a pivoting tank conveyor which minimizes the beets' fall into the holding tank, thereby reducing damage to the beets.

Another aspect or object of this invention is to provide beet harvesters having a hydraulically controlled offloading conveyor which preferably has the capability of folding out of the way, behind the header for transport.

Another aspect or object of this invention is to provide beet harvesters having tires and axles which permit the use of only two carrier wheels on the harvester, thereby enhancing maneuverability and lessening undesirable soil compaction.

Another aspect or object of this invention is to provide beet harvesters that can operate in muddier conditions than prior art harvesters due to improved cleaning capabilities.

Another aspect or object of this invention is to provide beet harvesters having a self-contained hydraulic subsystem which delivers power to the elevator motor and other components.

Another aspect or object of this invention is to provide beet harvesters with gage wheels to prevent the lifting assembly from digging into the soil on one side or the other in uneven ground.

Other aspects, objects and advantages of the present invention, including the various features used in various combinations, will be understood from the following description according to preferred embodiments of the present invention, taken in conjunction with the drawings in which certain specific features are shown.

SUMMARY OF THE INVENTION

In accordance with the present invention, beet harvesters provide flexibility in meeting harvesting needs and improved cleaning capabilities. Preferably, modular components allow interchangeability of the header assembly depending upon row configurations and can also provide interchangeability, if desired, of the elevators as between a ferris wheel assembly and a scrubber chain assembly. Additionally, in a preferred embodiment, the grabrollers are longitudinally-disposed so as to improve cleaning by providing continuous rearward flow of the beets from a transfer assembly to a rear-loading elevator assembly.

In an embodiment of the invention, the harvester includes a pivoting tank conveyor which allows for evenly filling a holding tank. The invention also can have a transfer assembly which can be easily removed with a hand-actuated winch for cleaning and maintenance. The present invention also preferably includes large diameter ground-engaging wheels and a component layout which is selected to provide improved balance and maneuverability when compared with more traditional carrier wheels and component arrangements.

In a further embodiment of a scrubber chain unit, when included, same preferably employs an improved wraparound design to reduce the amount of ground clearance needed underneath the elevator. Such modules are removable and interchangeable for customer needs or as dictated by different weather and soil conditions.

BRIEF DESCRIPTION OF THE DRAWINGS

FIG. 8a is a side elevational view illustrating a separated header assembly, transfer assembly and processing assembly;

FIG. 20 is a rear elevational view of a harvester according to this invention with a ferris wheel elevator assembly;

DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention and virtually any appropriate manner.

Equipment and methods of the types described herein are for harvesting crops that grow within the ground, at times referred to as root crops. From time to time herein, these are referred to by terms such as "beets," "sugarbeets," and "root crops." These terms are used substantially interchangeably, insofar as the invention has generally equal applicability to any such crops.

Figure 1:
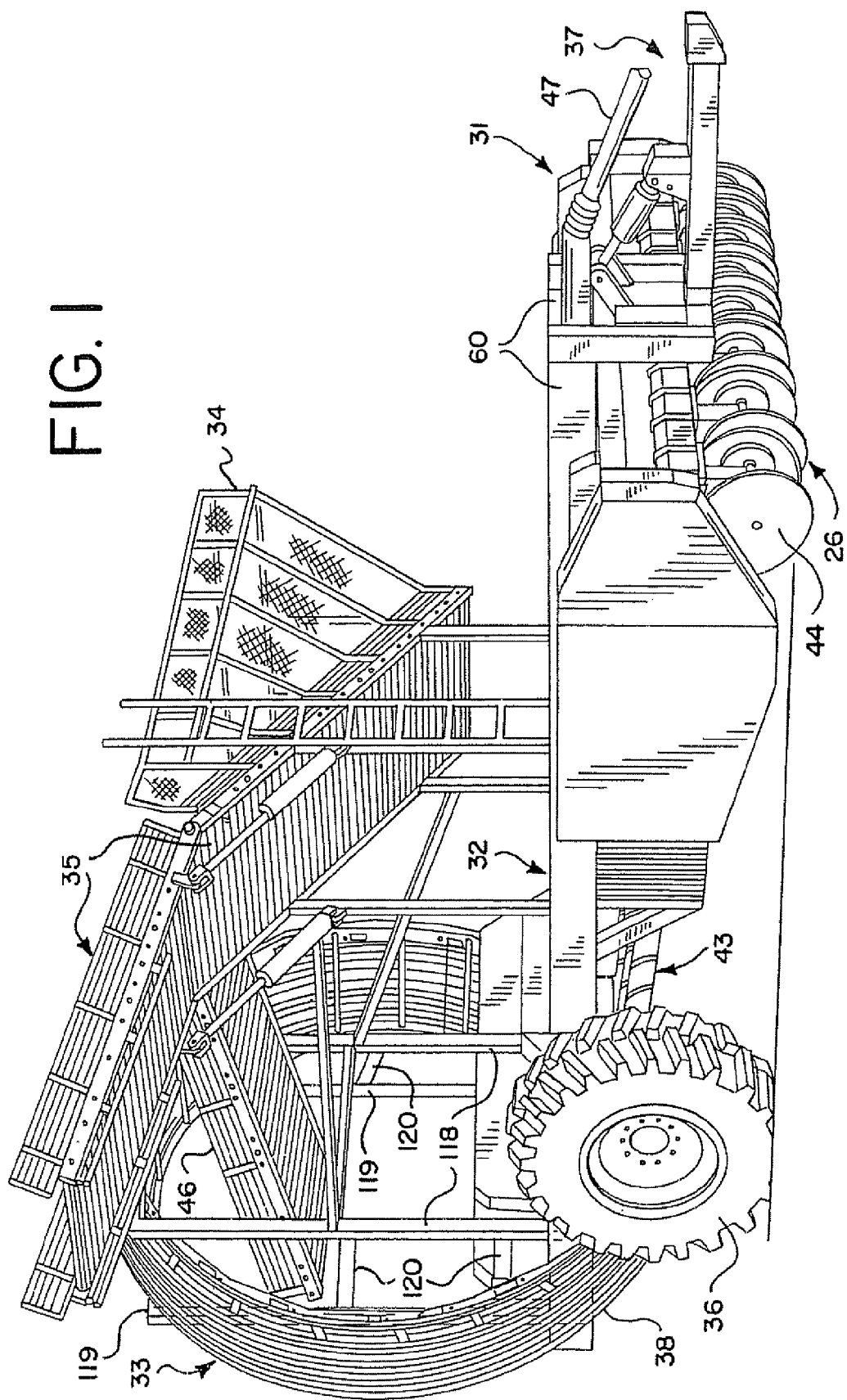
FIG. 1 is a perspective view of a beet harvester according to the invention, shown with a ferris wheel elevator assembly.

The preferred embodiment that is illustrated in FIG. 1 includes a header assembly, generally designated at 31, a processing assembly, generally designated at 32, an elevator assembly, generally designated at 33, a tank conveyor 46, a holding tank 34, and an offloading conveyor, generally designated at 35. Carrier wheels 36 also are provided. A tongue assembly, generally designated at 37, is positioned between two front portions or extensions 60 of the main frame that project horizontally from the front of the processing assembly 32.

Figure 2:
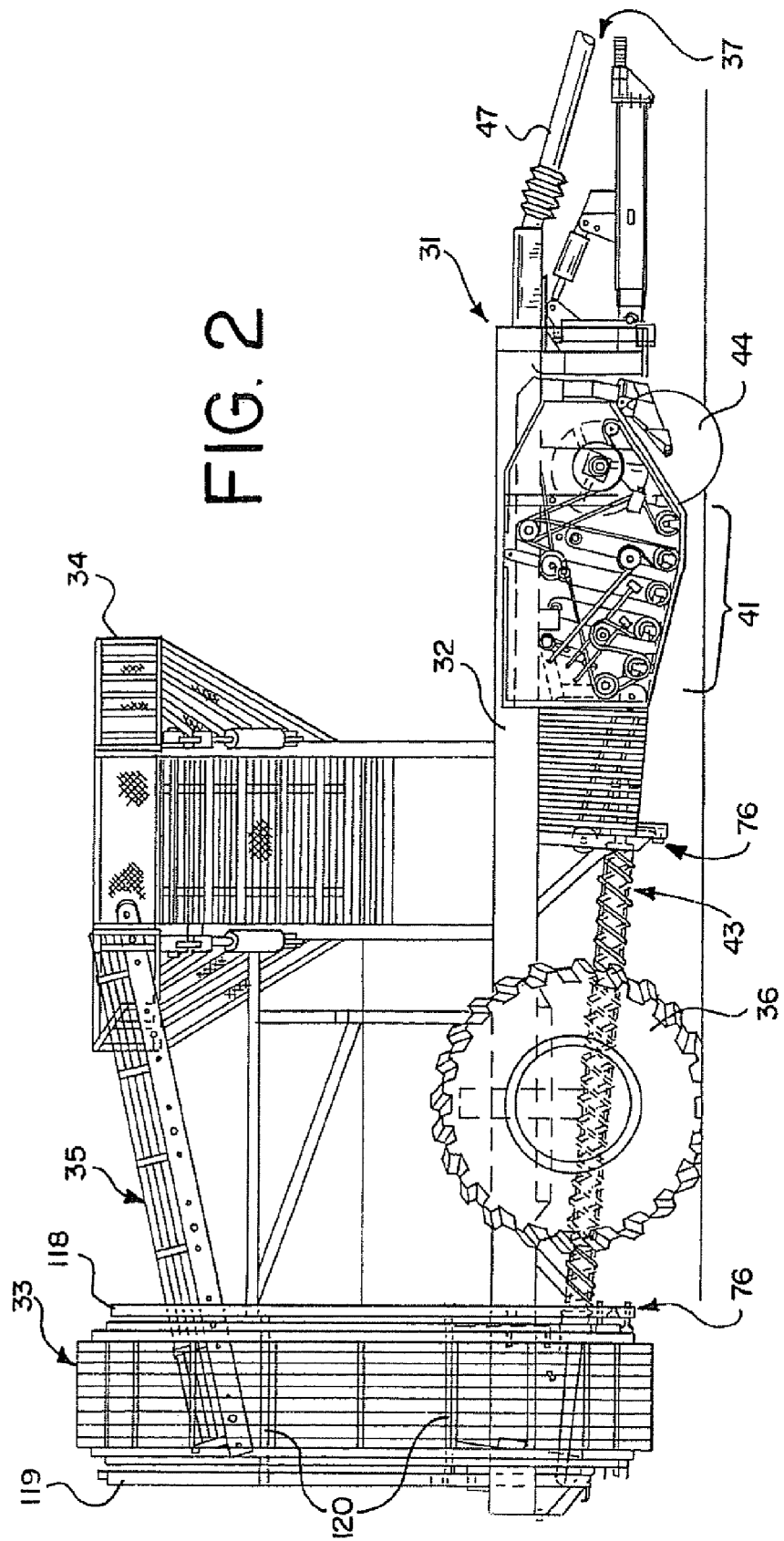
FIG. 2 is a side elevational view of the beet harvester illustrated in FIG. 1, with some components broken away for clarity.
Figure 3:
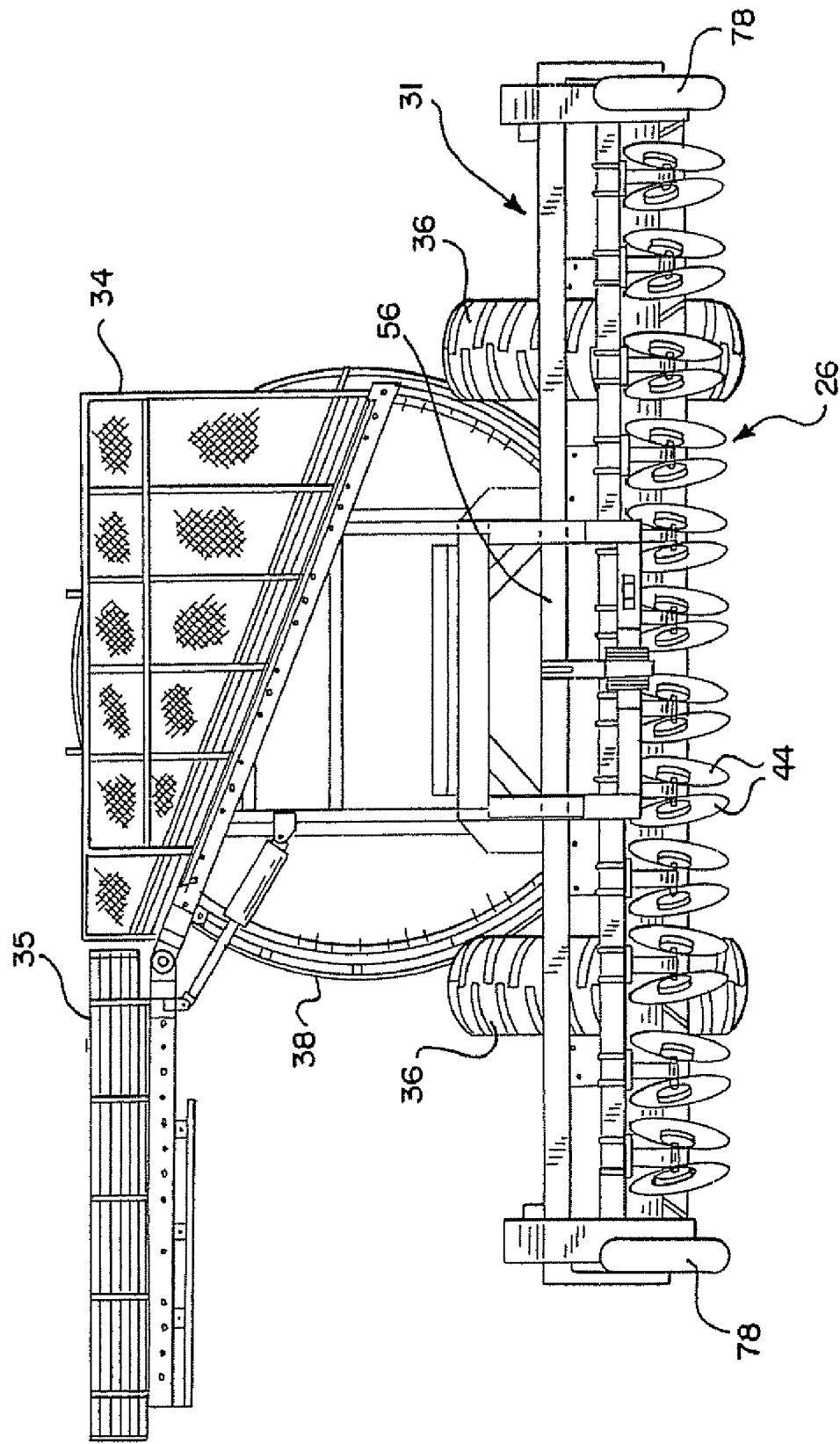
FIG. 3 is a front elevational view of a harvester with a twelve-row header assembly configuration and a ferris wheel elevator assembly.
Figure 4:
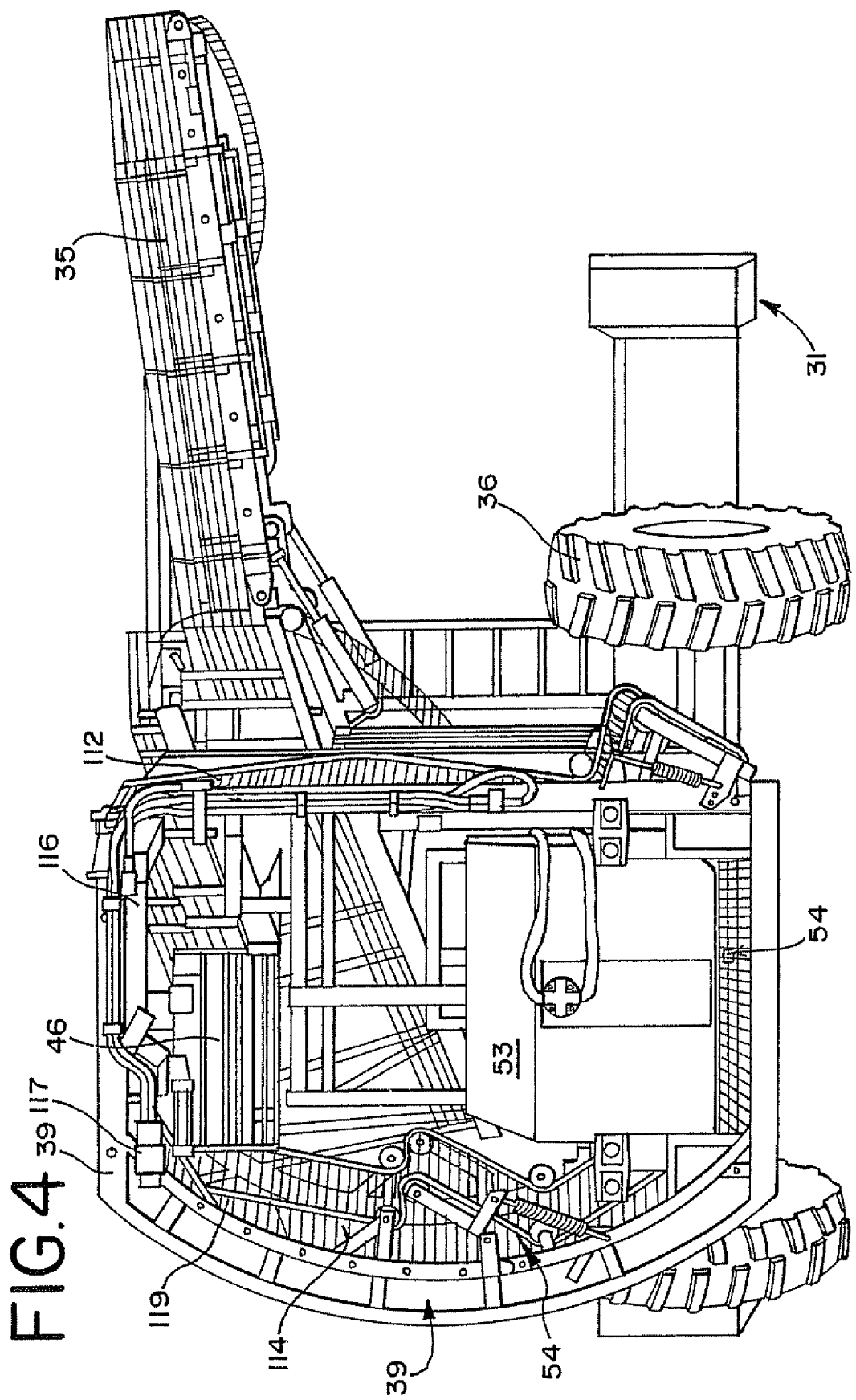
FIG. 4 is a rear elevation view of a harvester with a scrubber chain elevator assembly.
Figure 8B:
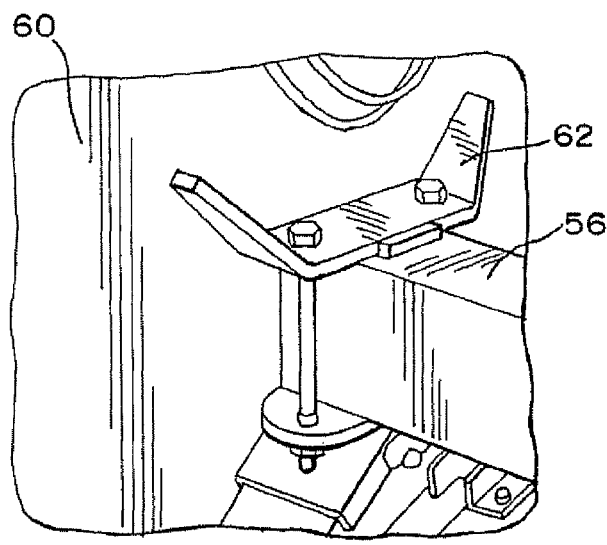
FIGS. 8b and 8c are perspective views of the front and rear mounting plates, respectively, for the header assembly to the processing assembly.
Figure 8C:
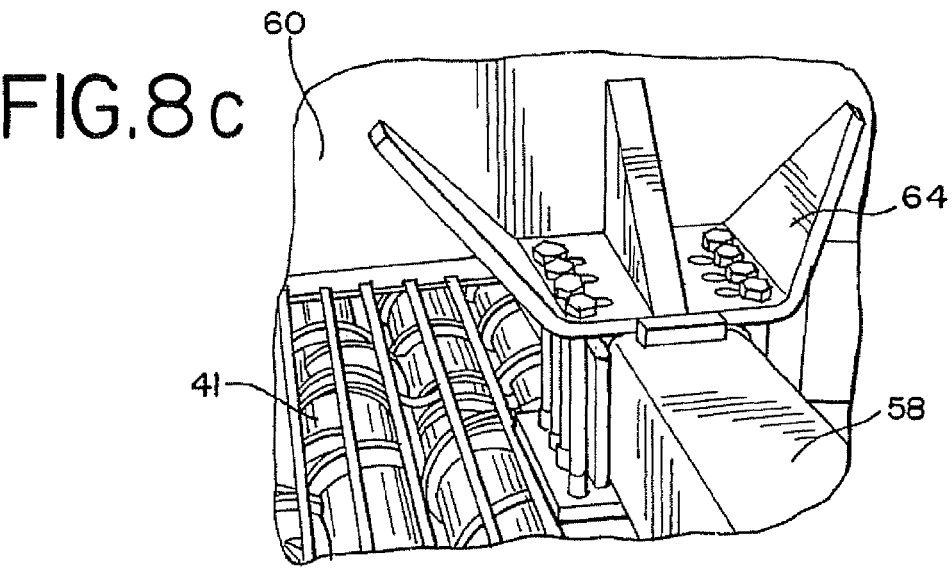

In connection with the preferred modular header embodiment, mounting members are provided. As shown in FIG. 8a, FIG. 8b and FIG. 8c, the extensions 60 each have two forward connection points 62 and two rearward connection points 64, respectively, at which the processing assembly 32 is bolted to the front and rear of the header assembly 31 at a forward transverse beam 56 and at a rearward transverse beam 58, respectively. These can be considered to collectively form a frame assembly. FIG. 1, FIG. 2, FIG. 3 and FIG. 5 show an elevator assembly which takes the form of a ferris wheel unit 38. FIG. 4 shows the elevator assembly taking the form of a scrubber chain unit 39.

Figure 6A:
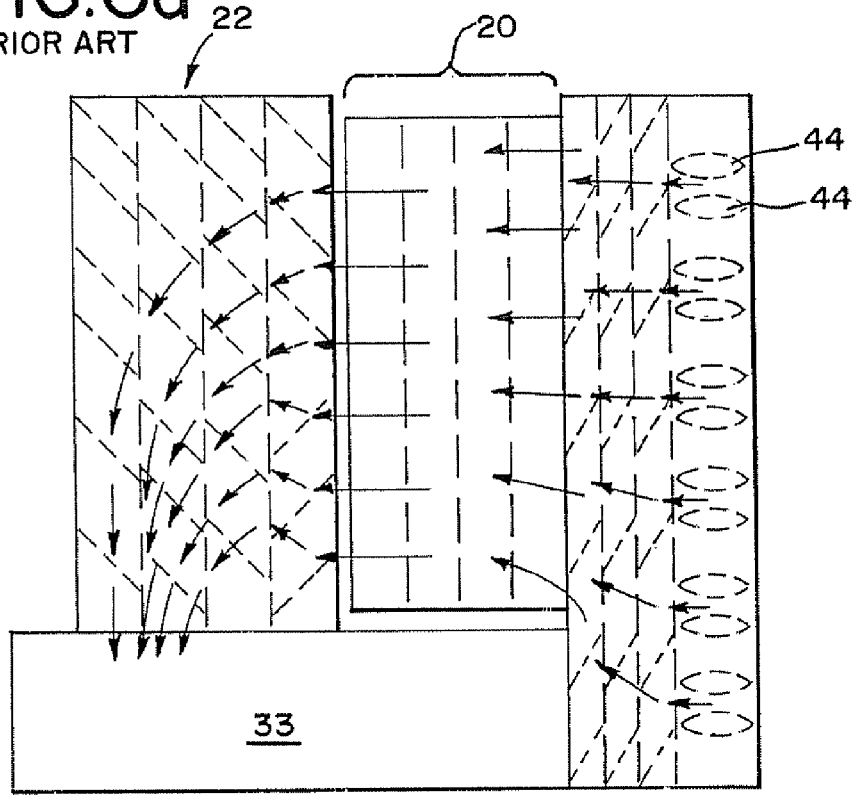
FIG. 6a is a schematic top plan view of the flow of beets through a prior art harvester.
Figure 6B:
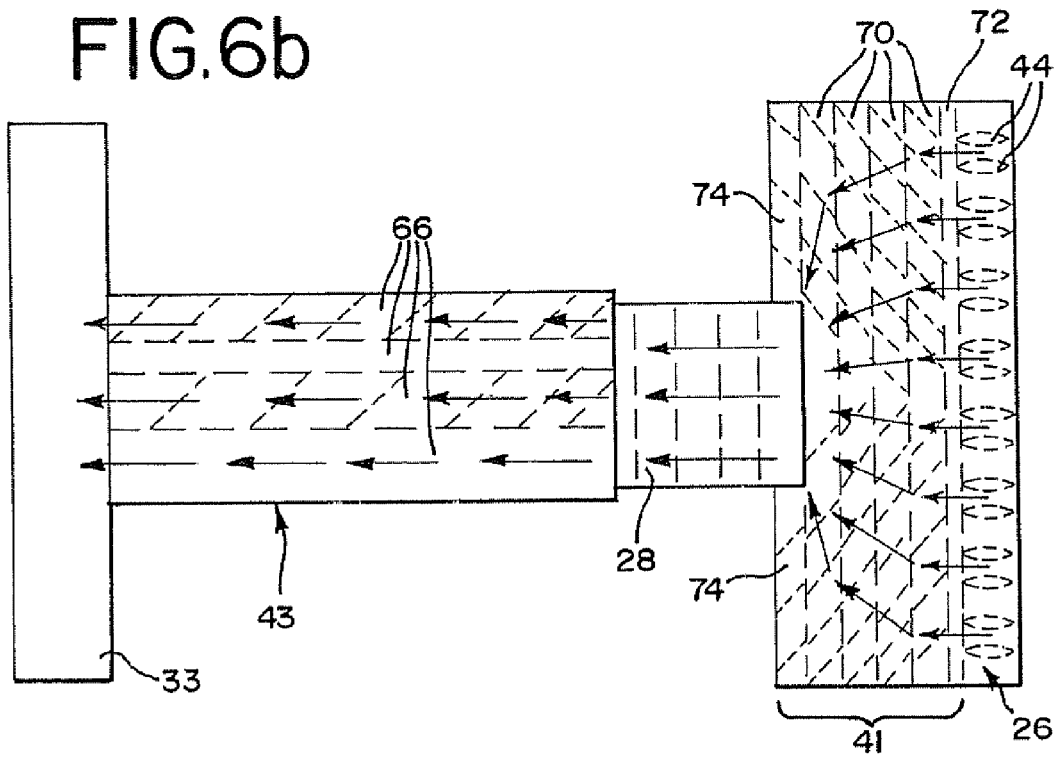
FIG. 6b is a schematic top plan view of the flow of beets through the harvester shown in FIG. 1.
Figure 7:
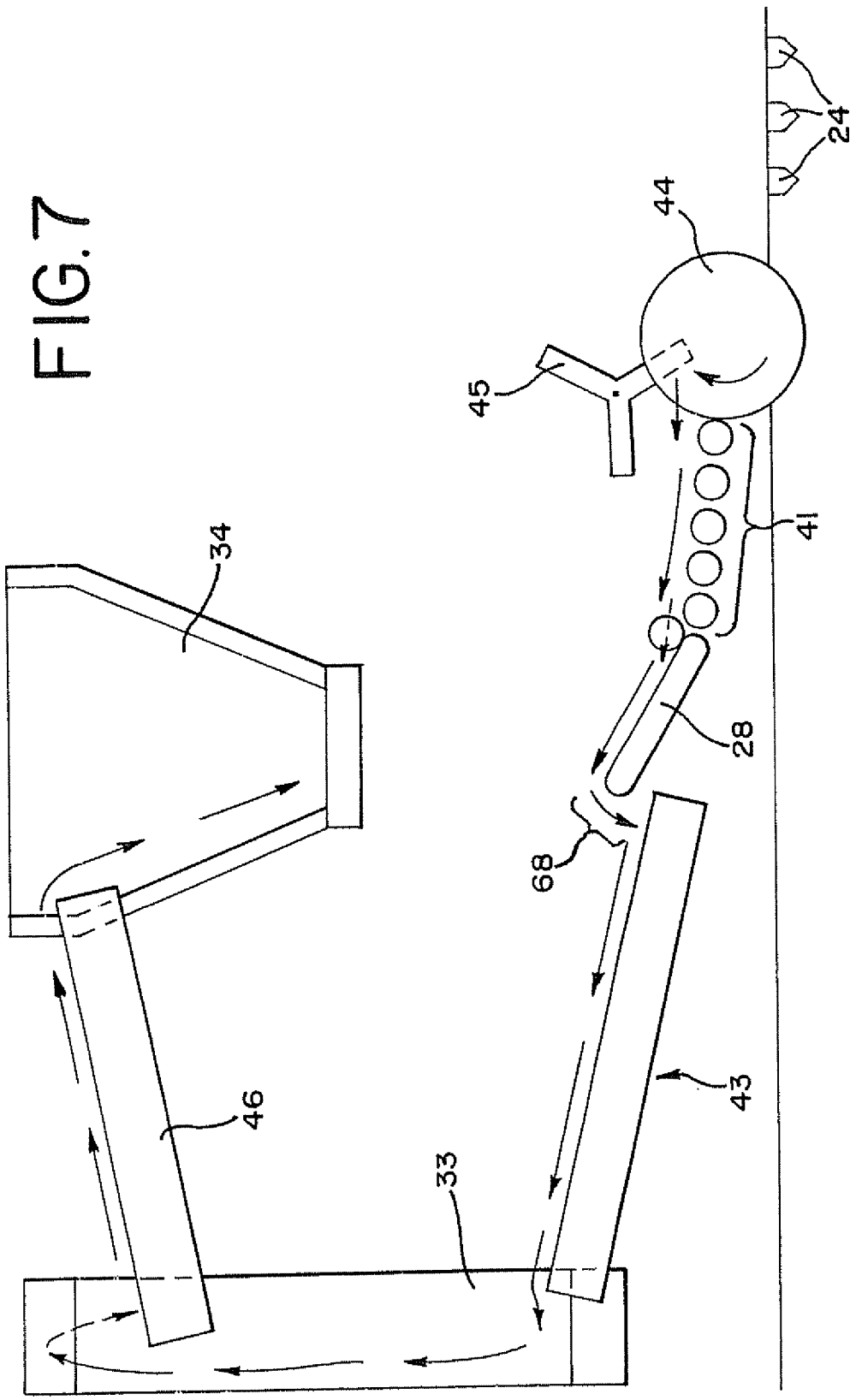
FIG. 7 is a schematic side elevational view of the flow of beets through the harvester shown in FIG. 1.

FIG. 6b and FIG. 7 summarize the general path that the beets follow from the front of the harvester to the rear and illustrate the continuous longitudinal flow characteristic. The beets 24 are unearthed by a lifting assembly 26 of the header assembly 31, comprising lifter wheels 44 in a preferred embodiment, and then contacted by rotating paddles 45. A header roller assembly 41 passes the beets rearwardly and funnels them into a relatively narrow transfer assembly 28. The transfer assembly 28 moves the beets back and preferably upwards, then drops them onto a grabroller assembly 43. The beets travel the length of the grabrollers, which drop the beets into the elevator assembly 33 at the rear of the harvester. The elevator assembly 33 lifts the beets and drops them onto a tank conveyor 46, which finally drops the beets into a holding tank 34. Guardrails are positioned at appropriate locations, such as along the conveyors, in order to prevent the beets from falling off of the harvester.

Optional features of the header include fixed or flex struts, a choice of a smooth or star front roller, and lifter wheel close-ups. Also available are different pitches of links for belted draper chain and sprockets, a choice of steerable or fixed carrier wheels, and a drawbar support. The flex struts are useful for rocky conditions, because they allow the lifter wheels to avoid subterranean rocks by flexing upward and rolling over them. The lifter wheels may be cushioned to separate when a rock is pinched between them. The star-type front roller also is useful for rocky conditions because it keeps rocks from getting stuck, while allowing soil to flow through. These benefits and the benefits of the other optional features are already well-known to those skilled in the art.

Figure 16:
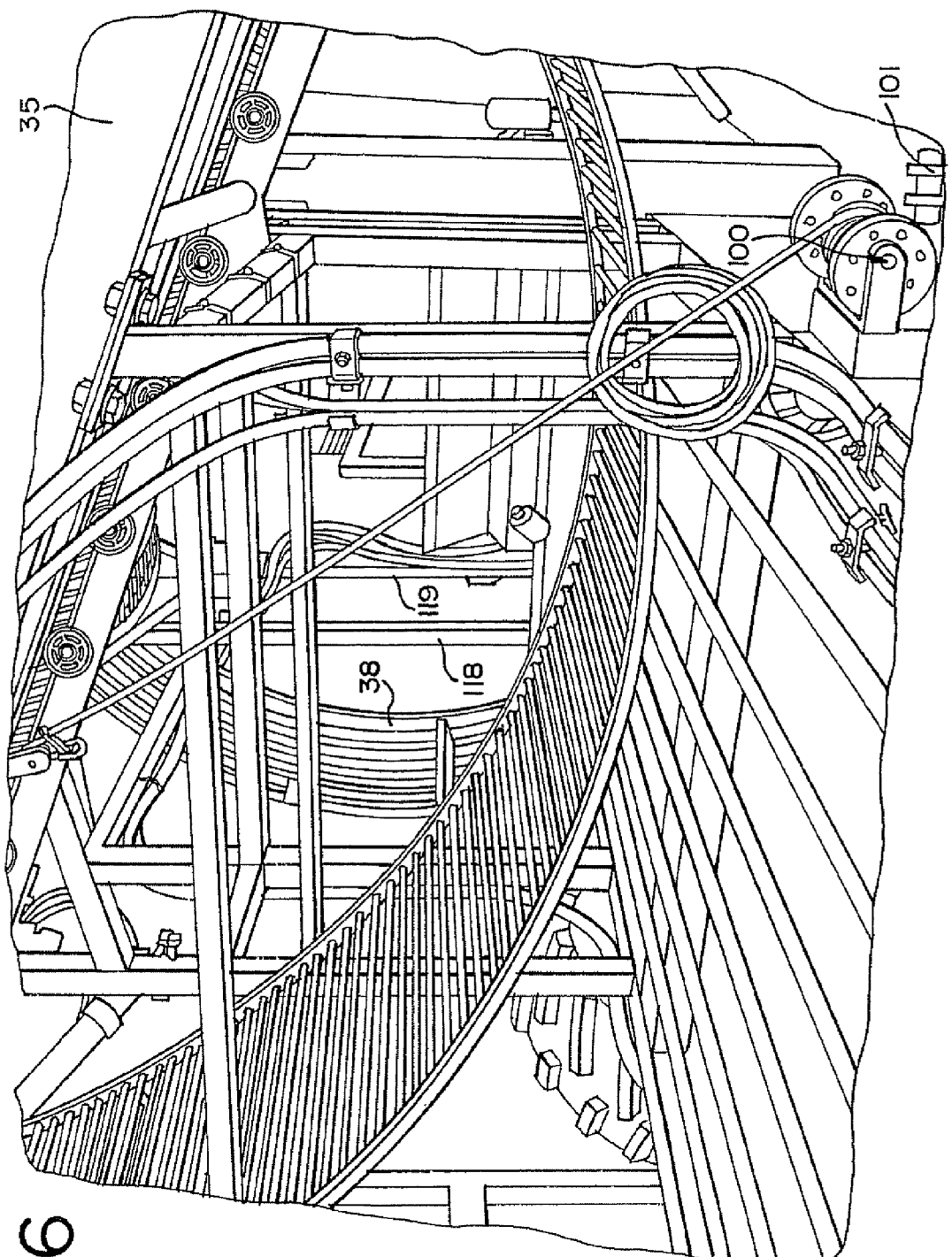
FIG. 16 is a detail view of an area of the harvester above the transfer assembly location, showing a winch for facilitating transfer assembly attachment.

Easy adjustment features preferably are incorporated into the design of the present harvester. For example, the tank conveyor 46 can pivot and the height of its discharge end can be varied in order to minimize the height through which the beets fall into the holding tank 34. In another area of the harvester, a winch 100 (FIG. 16) with a hand crank 101 is provided to allow easy removal and cleaning or maintenance of the transfer assembly 28.

Modular features preferably are incorporated into the harvesters. Most importantly, a modular header feature allows the processing assembly to accommodate interchangeable header assemblies which are specialized for different row configurations. In an embodiment which is illustrated in FIG. 3, the modular header assembly 31 is a unitary header configured to simultaneously harvest twelve rows of root crops. In addition, a modular elevator feature can be provided which allows the processing assembly to accommodate interchangeable modular ferris wheel and modular scrubber chain elevator assemblies.

A main objective is to provide a high capacity harvester with enhanced flow and cleaning action. The harvester according to the invention provides several stages for superior cleaning. As shown in FIG. 6b and FIG. 7, these include a transversally-disposed header roller assembly 41, a transfer assembly 28, a controlled drop 68 from the transfer assembly 28 onto an elongated assembly 43 of longitudinally-oriented grabrollers, the grabroller assembly 43 itself, and unobstructed flow into an elevator 33 which can be an optional scrubber chain elevator assembly 39.

Field tests have measured the substantially improved cleaning action of the invention when compared with traditional beet harvesters under similar field and harvesting conditions. Such field tests measure "tare", a well-known indicator of dirt and other debris that remain on the beets after their off load from a beet harvester. According to this testing, the lower the tare percentage, the more free of debris (or "cleaner") are the beets. Conversely, a higher tare percentage is a measurement of greater debris remaining and which was not removed from the beets when they were processed on the beet harvester. Field tests of the illustrated harvester resulted in a 1.8% tare, whereas prior art machines generally have a 7% tare in comparable field conditions.

Figure 12:
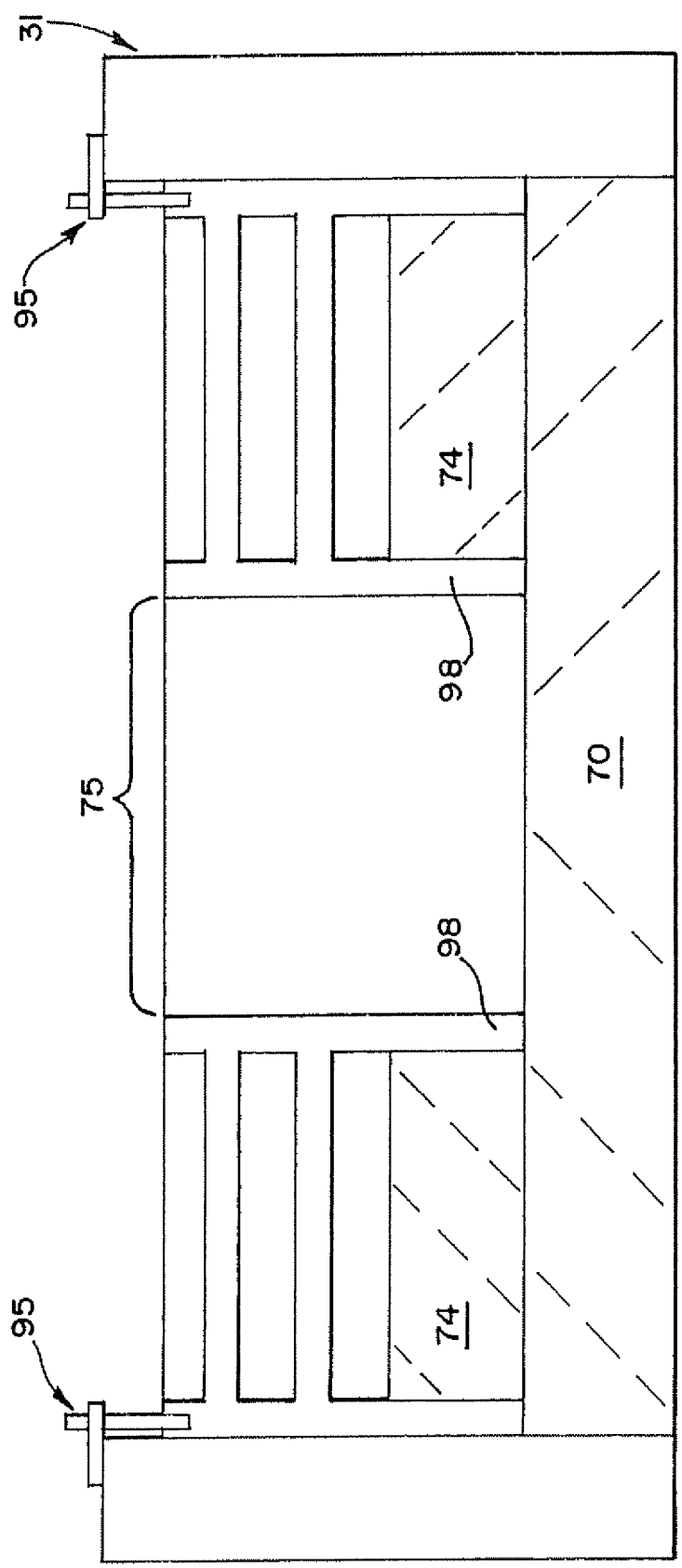
FIG. 12 is a rear elevational view of the header assembly.
Figure 14:
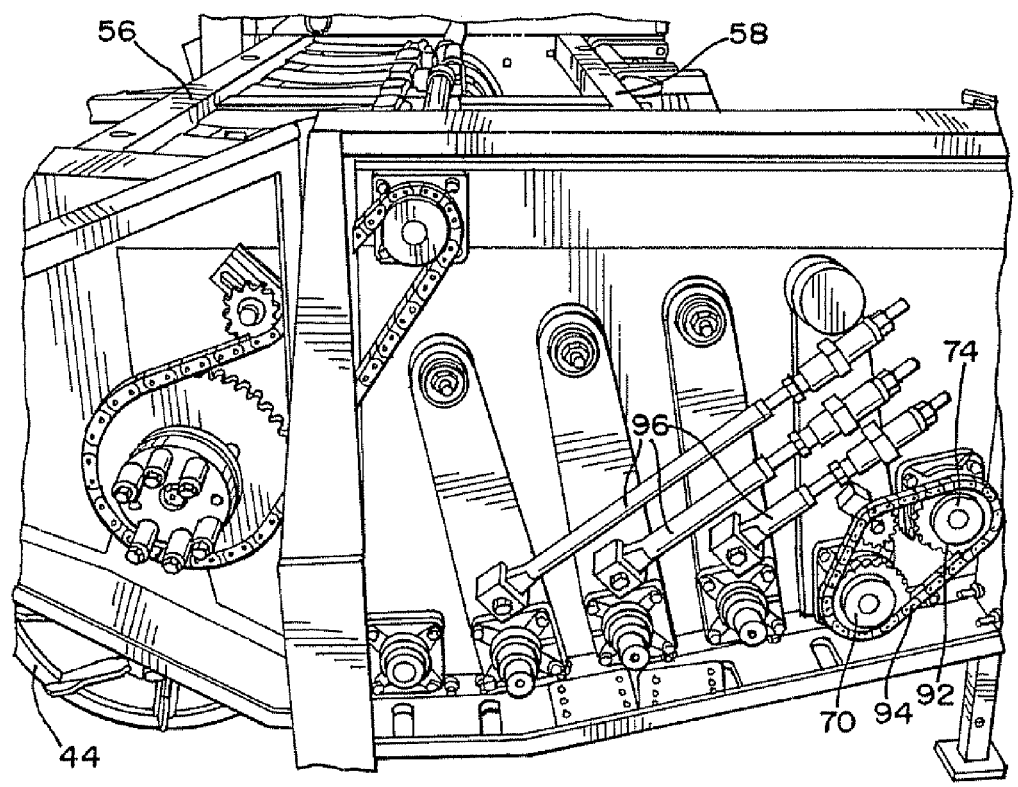
FIG. 14 is a side view of the header, showing an open left header door.
Figure 18:
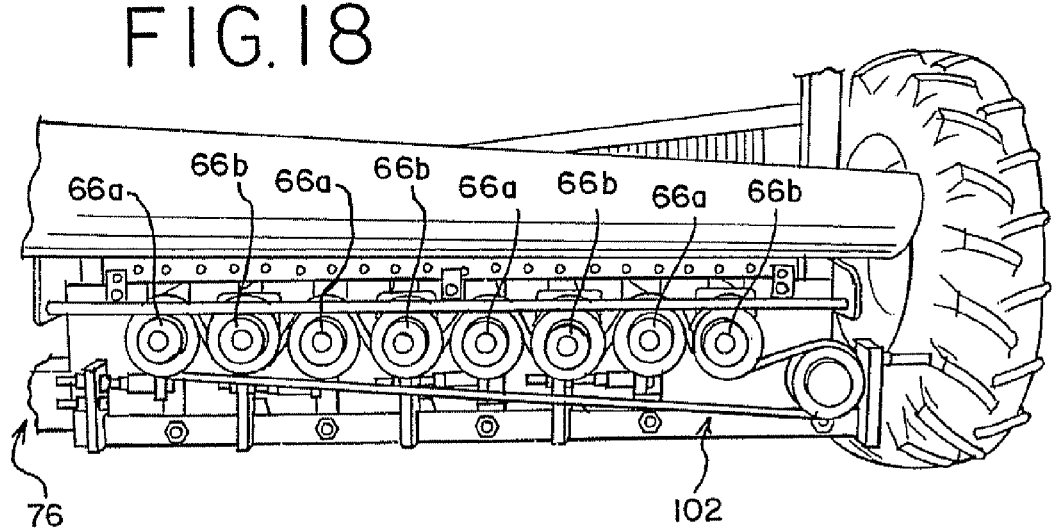
FIG. 18 is a detail view of an embodiment of the grabroller drive system.

An adjustable gap is provided between each of the header rollers 70 and between the paired grabrollers. FIG. 12 and FIG. 14 illustrate two components 95 and 96 of an assembly which allows the rollers of the header roller assembly 41 to be adjusted either simulataneously or individually. As for the grabrollers, each grabroller pair preferably includes a smooth grabroller 66a and a counter-rotating spiral grabroller 66b with a gap therebetween. These gaps can be adjusted all at one point on each end using a centering bolt 76, as generally shown in FIG. 18 for the front end of the grabrollers. As illustrated in FIG. 2, a similar centering bolt 76 may be positioned at the rear end of the grabroller assembly 43 to simultaneously adjust the gaps at the rear end of the grabrollers. The best cleaning is achieved by having the largest possible gap between adjacent header rollers 70 and between the paired grabrollers without allowing the beets to fall therethrough. Conventional idler sprockets usually are used in order to maintain proper chain tension at all adjustment positions.

Figure 10:
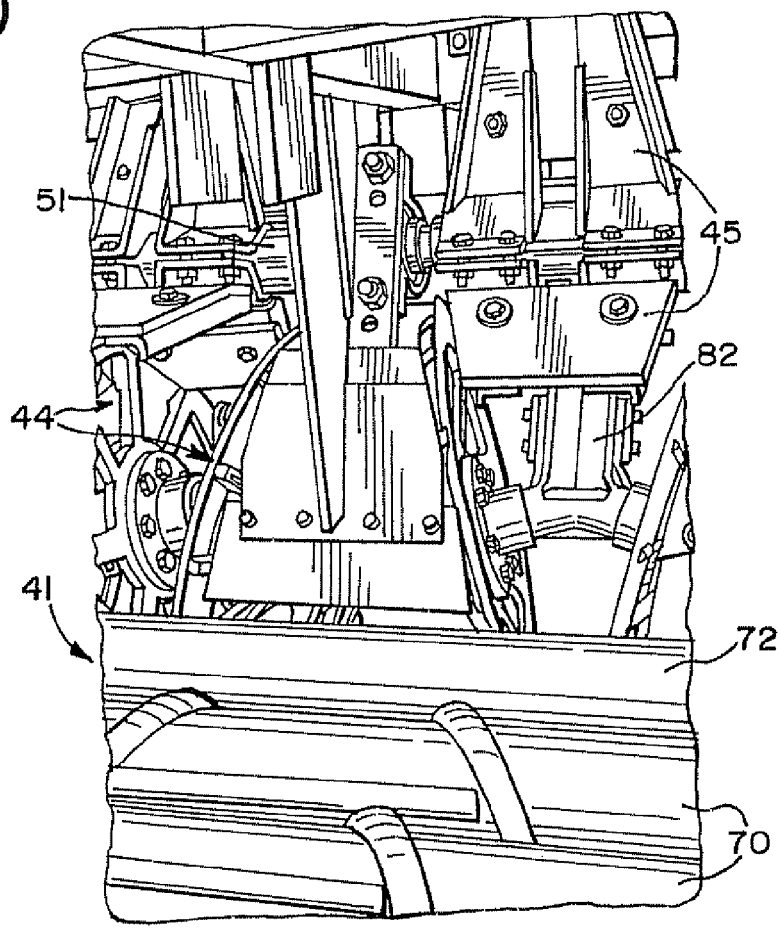
FIG. 10 is a detail view of certain portions of the header, showing the lifting assembly and paddle assembly and header roller assembly.
Figure 11:
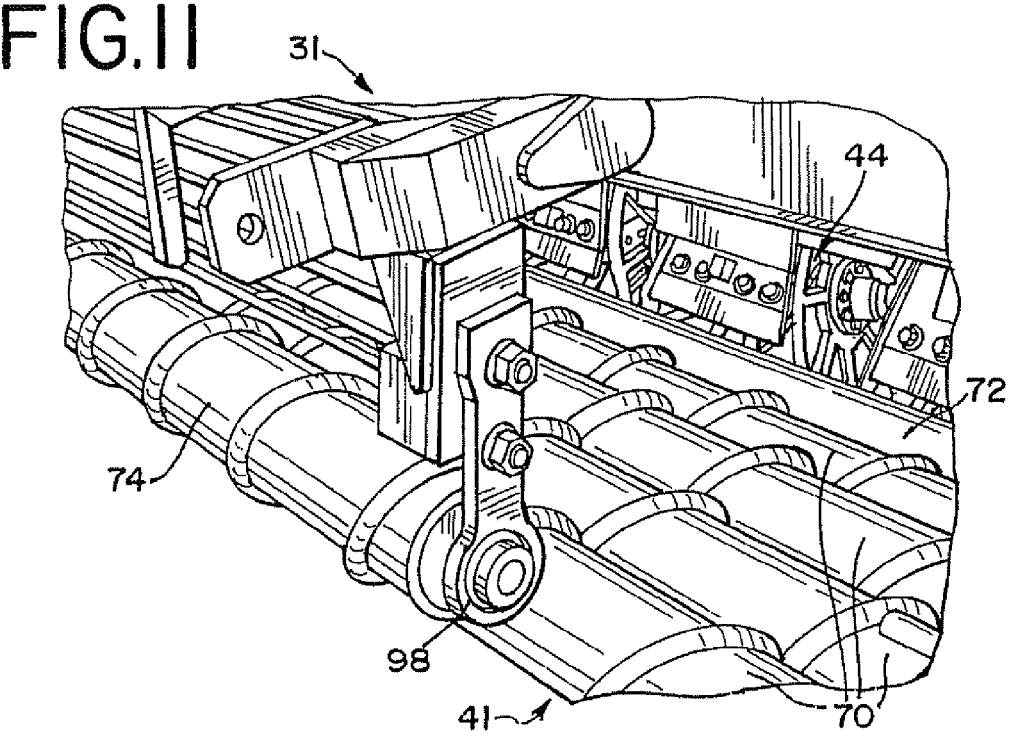
FIG. 11 is a detail perspective view of the header roller assembly.

FIG. 10, FIG. 11 and FIG. 12 illustrate the location of the components within the header assembly 31. In operation, lifter wheels 44 of the lifting assembly 26 penetrate the ground, pinching and forcing the beets upwardly. The beets then are contacted by rotating paddles 45 which propel the beets rearwardly. Immediately behind the paddles 45 is a front header roller 72, which can be either a smooth or star roller, followed by the four spiral conveyor rollers 70 that constitute the heart of the header roller assembly 41. These clean the beets, while moving them rearwardly, upwardly, and toward the longitudinal center of the harvester. Two shorter diverter rollers 74 downstream of the header rollers 70 are positioned approximately 45-50° above the rear header roller in order to halt the downstream flow of the beets and funnel them to a central gap or discharge area 75, where they pass onto the transfer assembly 28. This passage can include a drop to thereby provide a cleaning action.

The transfer assembly 28, which is a 3.5-foot long conveyor in a preferred embodiment, moves the beets upwardly and drops them onto the grabroller assembly 43. Such dropping of the beets effects beet cleaning action. All of the beets travel along the entire length of the grabrollers, which do the primary cleaning, and deliver the beets to the vertical elevator assembly 33. The elevator assembly 33, which can take the form of a ferris wheel 38 or a scrubber chain 39, for example, lifts the beets and transfers them for collection, such as by dumping them onto a tank conveyor 46. In this illustrated embodiment, then the beets are dropped into the holding tank 34 by the tank conveyor 46, which can pivot in order to minimize the drop and more evenly fill the tank 34. An offloading conveyor 35 can serve as the bottom of the holding tank 34. Of course, the beets can be held in the tank 34 while others are being harvested, or the offloading conveyor 35 can instead convey the beets to a waiting truck or other appropriate vehicle.

Figure 5:
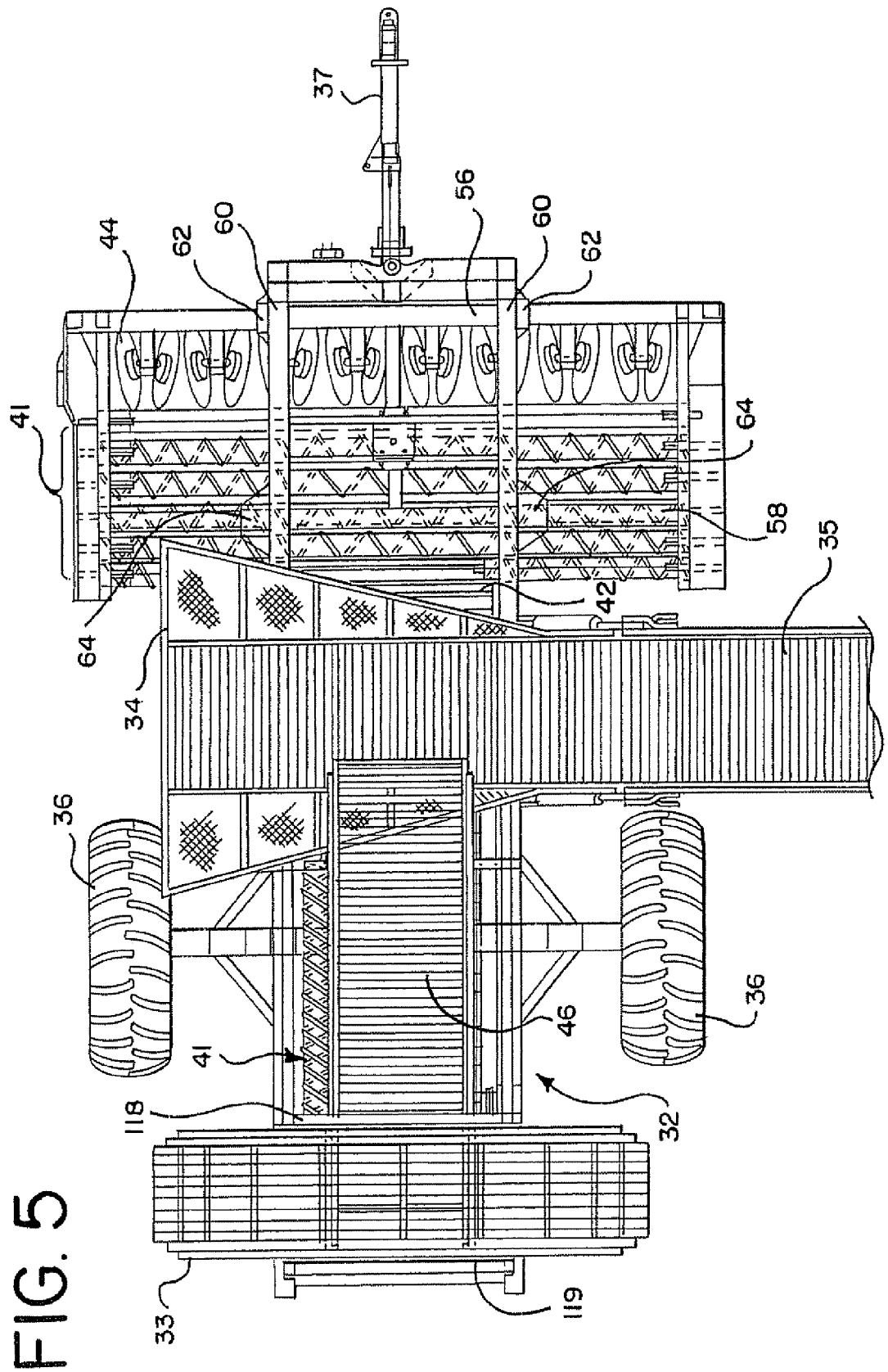
FIG. 5 is a top plan view of the beet harvester shown in FIG. 1.

Referring more particularly to the narrow frame design which is evident in the drawings, particularly FIG. 3 and FIG. 5, this is a true center line design. The illustrated holding tank 34 is elevated and its bottom surface is inclined, which provides excellent visibility for the operator. In addition, the orientation and placement of the grabroller assembly 43 generally underneath the processing assembly 32 provide good visibility into the harvester. The arrangement of the various components, especially the rear-loading elevator 33 and the carrier wheels 36, results in superior lateral and fore-and-aft balance both in the field and on the road, allowing for ease of road transport and optimum traction for the tractor.

An important aspect of this invention is the use of interchangeable header assemblies. Beets must be harvested in the same row spacing and usually according to the same number of rows as they were planted or an even divisor thereof. Different planters utilize different row configurations, so no harvester with a single lifting assembly can harvest all fields. As such, separate six-row, eight-row, and twelve-row header assemblies for example are provided with six, eight, and twelve pairs of lifter wheels, respectively. Of course headers for accommodating other row configurations may be provided without departing from the spirit and scope of this invention. When an especially long header, such as the twelve-row option shown in FIG. 3, is selected gage wheels 78 may be affixed to the front corners of the header assembly 31 to assist in transportation.

A modular beet harvester according to the invention preferably provides a simplified connection process by positioning the header and diverter rollers wholly within the header assembly and by utilizing two beams 60 that extend from the front of the processing assembly. As illustrated in FIG. 8a and FIG. 8b, each beam 60 is bolted to the header assembly 31 at two points 62 and 64: one is located generally at the front of the header assembly and one generally at its rear. The mechanical connections between the header 31 and processing assemblies 32 consist of attaching the latter's gearbox to two drive shafts in the header assembly 31 which drive the components of the header assembly 31. Thus, the same processing assembly 32 can be used for any number of modular header assemblies 31, without having to resort to difficult interconnections between the units. Such is a substantial improvement over U.S. Pat. No. 4,197,916 (Haverdink, et al.), showing a harvester that located the diverter rollers behind the transfer conveyor. As a result, connecting the header to the processing assembly included the complicated step of journaling one bearing of each of the diverter rollers directly into a bracket located on the processing assembly.

Figure 24:
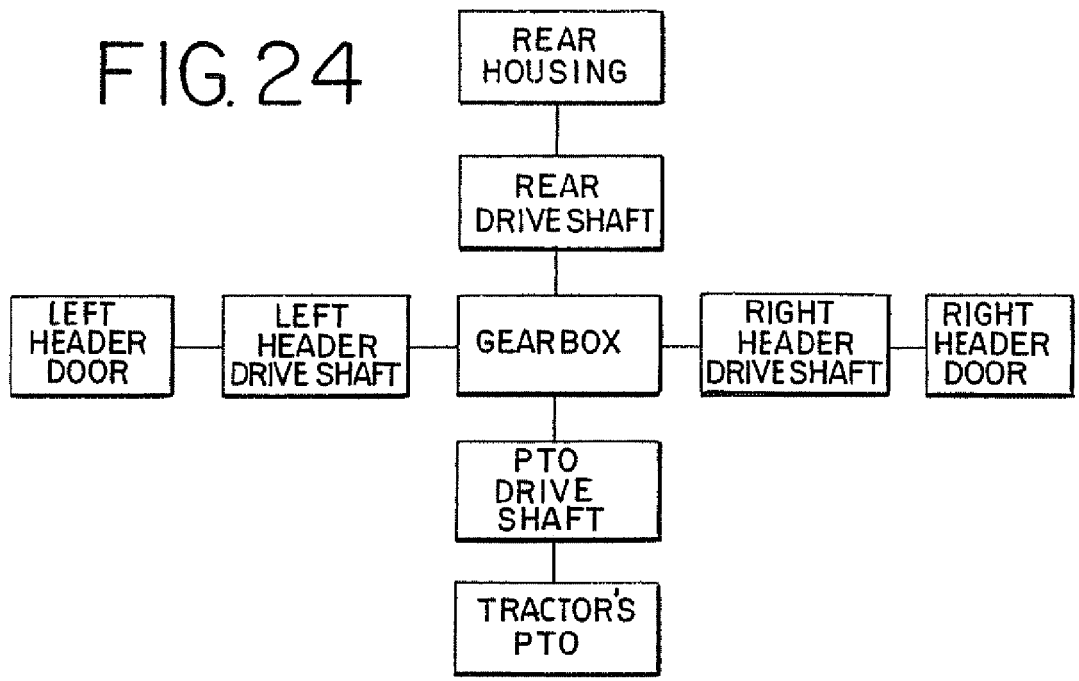
FIG. 24 is a schematic drawing of a mechanical system suitable for the beet harvester according to this invention.

A super heavy duty tongue assembly 37 which generally spans the gap between the two beams 60 can be seen in FIG. 5. This is a fully adjustable swivel tongue. It has two lift cylinder positions for adjustability and lifts from six inches below ground to eighteen inches above ground. FIG. 24 and FIG. 25 schematically show the harvester's power takeoff driveshaft and hydraulic hoses respectively, which connect to the tractor and provide mechanical and hydraulic power to the harvester. The tongue has a steering cylinder which is powered by the tractor/harvester hydraulic subsystem and controls the direction of the header assembly 31. The steering cylinder can be manually operated or controlled automatically by an optional rowfinder in a manner generally known in the art.

Figure 9:
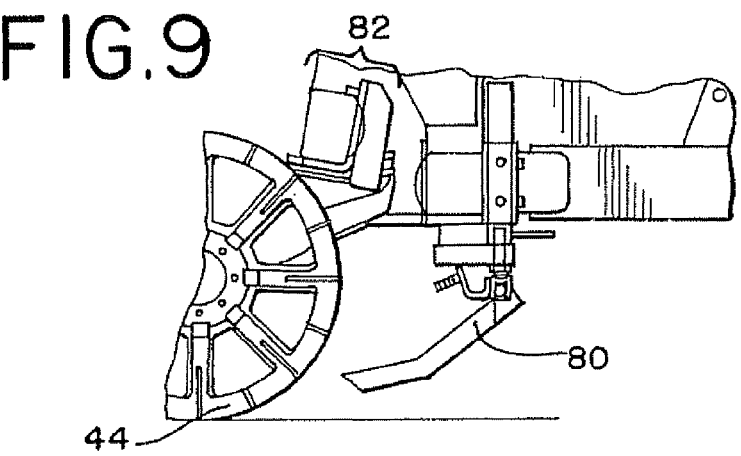
FIG. 9 is a detail side elevational view of an embodiment of the header assembly.

FIG. 9 shows the optional rowfinder 80, which is hydraulically connected to the steering cylinder on the hitch. The rowfinder 80 has two feeler arms that straddle the row and follow the line of beets. When the feeler arms sense lateral movement they actuate the hydraulic valve, which causes the steering cylinder to extend or retract and maneuver the harvester into proper alignment. An override function allows the operator to disengage the rowfinder 80 and manually steer the harvester, which is helpful when entering rows.

Super duty struts 82, illustrated in FIG. 9, also are provided. They are generally disposed at the front of the header assembly 31 and each strut 82 reaches downward to support a pair of lifter wheels 44. The struts 82 are laterally affixed to a header member upon which they can be adjusted in order to better align the lifter wheels 44 with the row configuration. The use and operation of lifter wheels 44 as the active part of a lifting assembly 26 is well-known to those skilled in the agriculture industry. These are rotated with spindle compensation to allow the paddle shaft 51 to be in the exact positions as prior harvesters. The struts 82 can be either fixed or flexible, which is preferred for rocky harvesting conditions.

Figure 13:
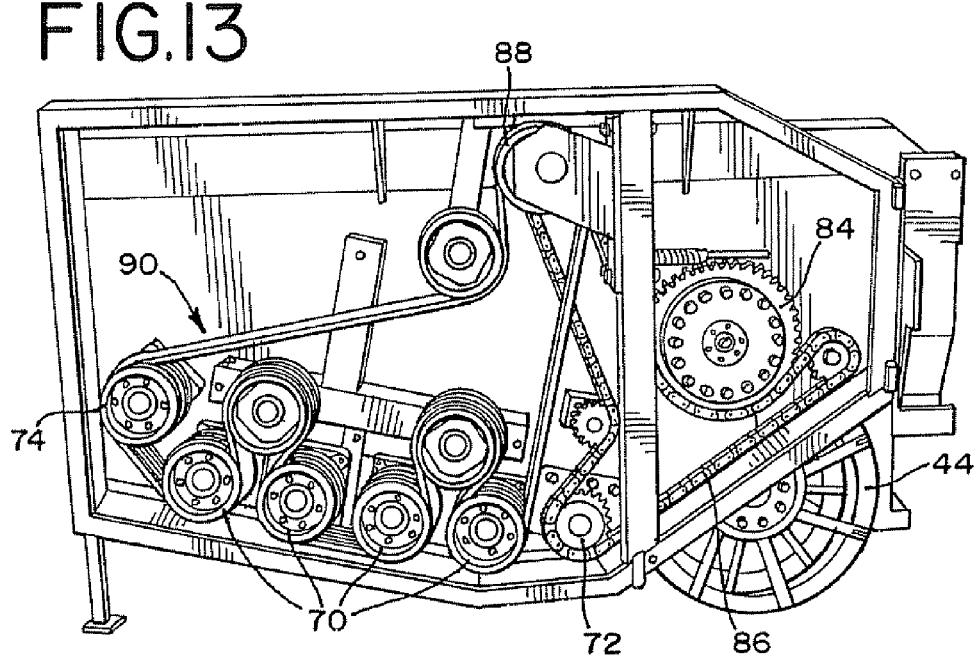
FIG. 13 is a side view of the header, showing an open right header door.

The paddle shaft 51, best seen in FIG. 10, mounts the paddles 45. The individual paddles 45 are located to rotate and strike the beets as they are raised by the lifter wheels 44. The paddle shaft 51 is generally located above the lifter wheels 44 for improved beet injection and elimination of dirt buildup on the lifter struts 82. Furthermore, the paddles 45 are staggered so that adjacent paddles 45 contact the beets at 300 intervals, which prevents excessive shock loads to the paddle shaft 51 and drives. As illustrated in FIG. 13, a slip clutch 84 can be provided to protect the paddle shaft 51. FIG. 13 also shows that the paddle shaft 51, through the slip clutch 84, is rotated by a chain 86 that is coupled to a sprocket 88 of the header roller belt drive system 90. Typically, the slip clutch 84 can be of the ratchet jaw type if used in conjunction with steel rollers or the friction disk type if the rollers are instead coated with polyethylene.

As best shown in FIG. 11 and FIG. 12, the header roller assembly 41 preferably includes four spiral rollers 70, two diverter rollers 74, and a front smooth or star roller 72, as crop, soil, and harvesting conditions dictate. The spiral rollers 70 ("header rollers") preferably are disposed so that the beets generally follow a shallow incline from the front to the rear of the header roller assembly 41. In a preferred embodiment, the header roller incline is in the range of 5-15° and most preferably within a range of 8-12°. The header rollers 70 generally span the width of the header assembly 31, so different header rollers 70 typically will be used with header assemblies 31 of different widths. In this illustrated embodiment, the two diverter rollers 74 are spiraled, but shorter than the header rollers 70, such that there is a central gap 75 between the inner ends of the diverter rollers 74 when their outer ends are aligned with the bearings of the header rollers 70, as shown in FIG. 12. While the header rollers 70 are preferably disposed at a shallow incline, the diverter rollers 74 are disposed 45-50° above the rear header roller to prevent the rearward flow of the beets and to direct the beets into the central gap 75. The header rollers 70 guide the majority of the beets into the central gap 75 and the diverter rollers 74 funnel the rest into the gap 75.

The header roller belt drive system 90 is located in the right header door, as shown in FIG. 13. FIG. 13 also shows that one of the diverter rollers 74 of this embodiment is driven by the same belt that drives the header rollers 70, whereas the front roller 72 is part of the same chain drive system 86 that powers the paddle shaft 51 through the slip clutch 84. FIG. 14 depicts the left header door, which shows the other diverter roller 74 being driven by a gear 92 that is coupled to the rearmost header roller 70 by a chain 94.

The first three header rollers 70 preferably are spring-cushioned and have a single point adjustment. FIG. 12 shows the threaded links 95 of the header roller adjustment feature which facilitates consistent and simultaneous adjustment of the spacing between the header rollers 70. Adjusting the threaded links 95 moves a pair of brackets 98 which in turn move the header rollers 70 and diverter rollers 74. In a preferred embodiment the rearmost header roller 70, the diverter rollers 74, and the intake end of the transfer assembly 28 are interconnected so as to prevent adjustment of the spacing therebetween. FIG. 14 shows three optional adjustment rods 96 for adjusting the spacing between the individual header rollers 70. The adjustment rods 96 are similarly situated in both header doors when the individual adjustment feature is used. A preferred embodiment sets a nine-inch space between the center shafts of the header rollers 70, but the spacing should be increased when additional cleaning is needed in rougher or muddier conditions.

Figure 15:
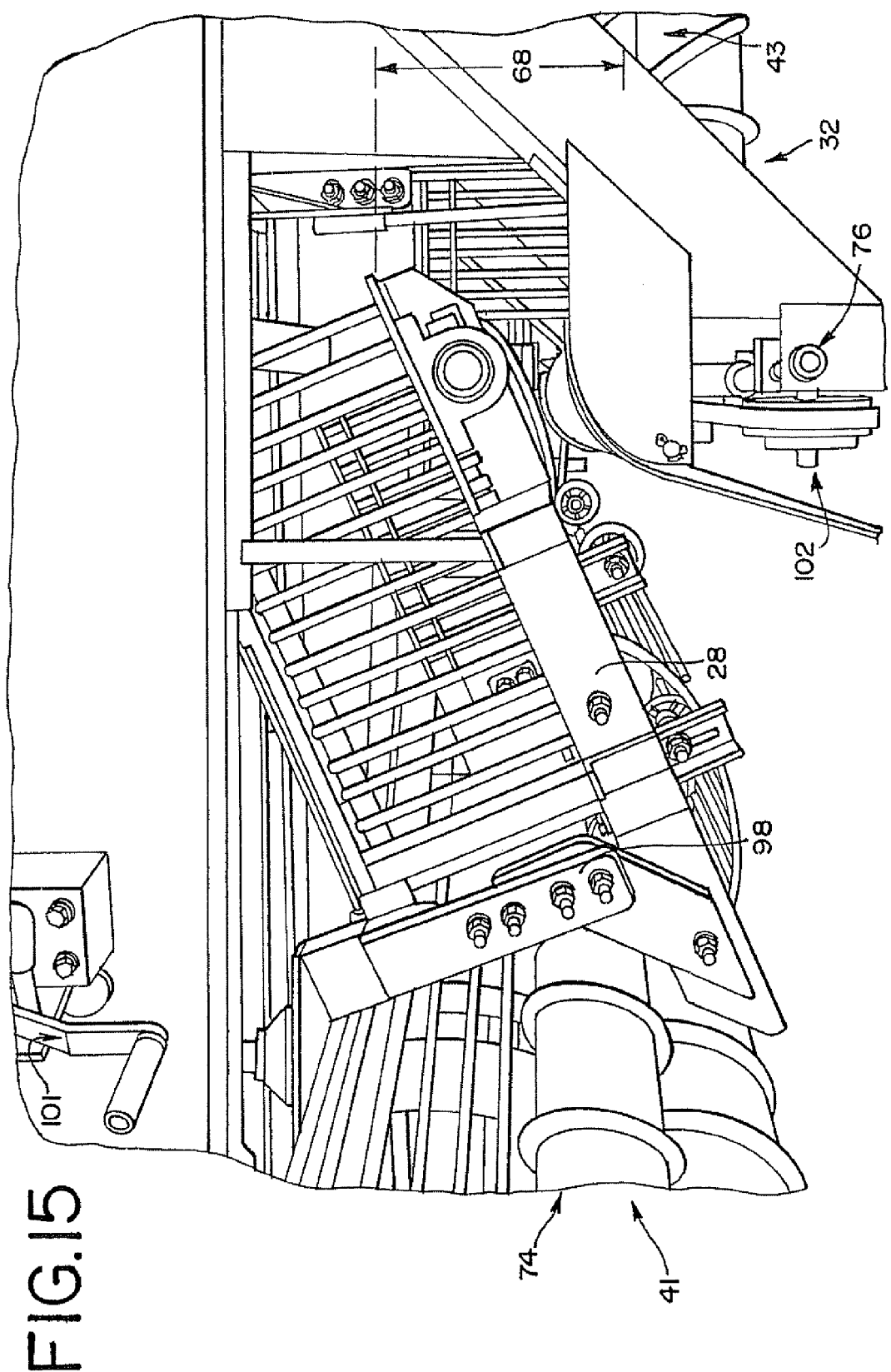
FIG. 15 is a side view of an embodiment of the transfer assembly.

The beets pass from the header roller assembly 41 and land on the transfer assembly 28. The transition from the header rollers 70 to the transfer assembly 28 causes soil to fall away from the beets due to the different flow speed and track surface profiles. The intake end of the transfer assembly 28 is bolted to a bracket 98 at the rear of the header assembly 31 in alignment with the central gap 75, as illustrated in FIG. 15. The other end of the transfer assembly 28 is allowed to free float above the frame of the processing assembly 32 because its discharge location changes as the spacing between the header rollers 70 is adjusted. This also facilitates easy removal and cleaning or maintenance of the transfer assembly 28, because only the intake end must be unbolted from the harvester. Once the transfer assembly 28 is disconnected, it may be raised by a winch 100, shown in FIG. 16, which is actuated by a hand crank 101.

The transfer assembly 28 may take the form of a conveyor, as illustrated in FIGS. 2, 5, 8a, 15. Such a conveyor preferably includes a belted chain with a one and one half inch total riser. As per FIG. 25b, the belted chain is driven by the harvester's self-contained hydraulic subsystem and physically rotated using two sprockets. In a preferred embodiment, the transfer assembly 28 passes the beets along a 10-28° incline or, more preferably, along an 18-24° incline.

After the transfer assembly 28 moves the beets upwards and downstream, they experience an important cleaning stage when they are dropped onto the grabroller assembly 43 and more dirt is knocked free. In a typical embodiment, the controlled drop from the transfer assembly 28 to the grabroller assembly 43 is within the range of 8-10 inches.

The main cleaning stage in traditional beet harvesters is the grabroller assembly, which typically utilizes transverse counter-rotating spiral and smooth rollers to clean and transfer the beets. Traditional transversely-disposed grabrollers are inefficient because the flow path along such transfer conveyors is such that most of the beets do not cross the entire length of the cleaning bed as illustrated in FIG. 6a. Many beets have a cleaning path which "short circuits" and engages only a short length of a few of the grabrollers. Prior art beet harvesters with rear-loading elevator assemblies have the grabrollers oriented 900 to the direction of travel. This results in having to use "kickers" and/or other methods in order to move the beets to the elevator assembly while still accomplishing beet cleaning. Often this results in damage to the beets and a machine which is very sensitive to weather and soil conditions.

Figure 17A:
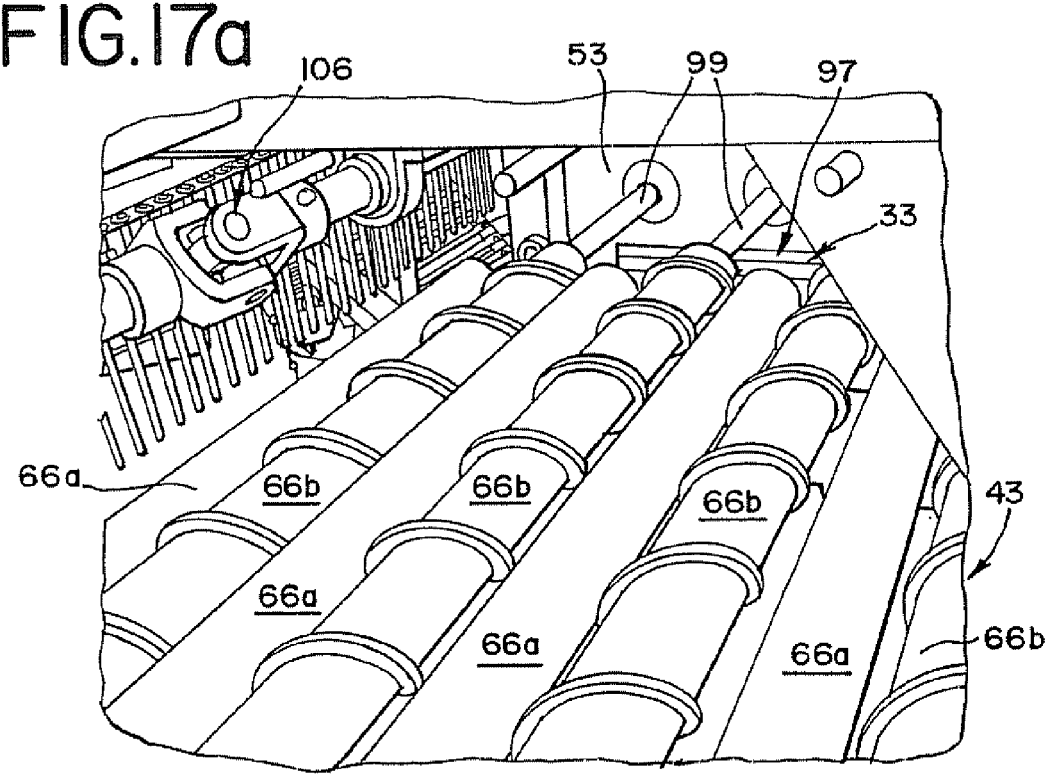
FIG. 17a and FIG. 17b are detail, perspective views of a rear portion of the grabroller assembly.
Figure 17B:
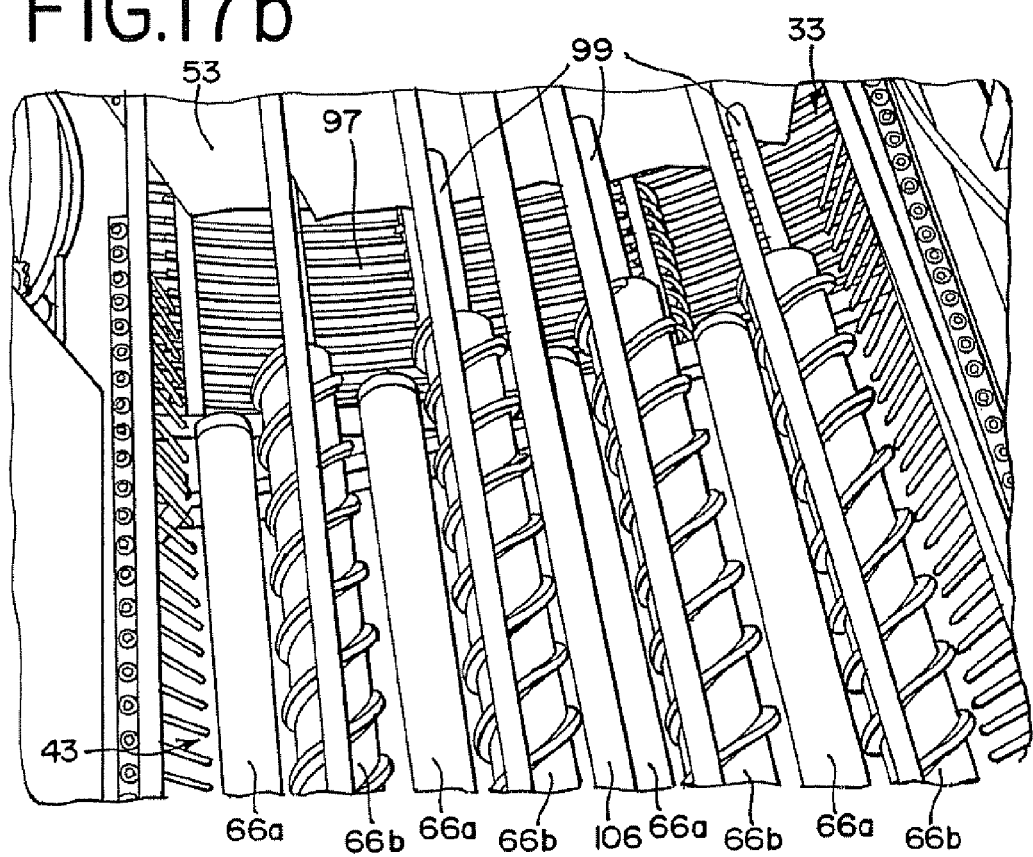

In a preferred embodiment of this invention shown in FIG. 17a and FIG. 17b, four longitudinally-oriented, ten-foot long spiral/smooth roller pairs, that is eight rollers, provide the grabroller assembly 43. Additionally, the grabrollers may be slightly inclined from the front to the rear. A steeper incline will result in more aggressive cleaning, but too much can damage the beets. In a preferred embodiment, the slope falls within a range of 0° to 10° and, more preferably, between 3° and 7°.

In an important feature, the grabrollers run parallel to the crop rows or longitudinally with respect to the axis of the harvester. This design avoids the problems of prior art harvesters by ensuring that all of the beets travel substantially the full length of the grabrollers bed by being deposited on one end of the cleaning bed of grabrollers and then being required to travel to the other end of the grabrollers before reaching the elevator assembly 33.

As illustrated in FIG. 6b, an additional advantage provided by the longitudinal grabrollers is that the direction of the beets does not change from the transfer assembly 28 to the end of the cleaning bed. This provides a continuous flow which is an axial or longitudinal flow path. Dirt and beets tend to accumulate at the point in prior art harvesters where the flow transitions from longitudinal to lateral, which tends to clog the grabrollers and degrade their performance. Because this accumulation is especially troublesome in muddy conditions, prior art beet harvesters cannot operate under muddy field conditions. The longitudinally-disposed grabrollers of the present harvester allow the beets to continue their longitudinal downstream flow after leaving the transfer assembly 28, so there is no transition point for beets and debris to accumulate. Hence, the longitudinally-disposed grabrollers allow the harvester to operate in muddy conditions that cannot be serviced by prior art harvesters.

Another aspect of the longitudinal flow characteristic of the invention is a direct and generally unobstructed manner by which the beets move off the grabroller assembly 43 and to the elevator assembly 33. This is illustrated, for example, in FIG. 17a and FIG. 17b. Beets moving along the grabrollers feed directly into the elevator assembly 33, which then rapidly takes the beets to the elevated machine components as discussed elsewhere herein. In this regard, it will be appreciated that, in the illustrated embodiment, the beets drop off the ends of the grabrollers and into the elevator intake location 97 which is devoid of the grabroller surfaces to provide ample open space within which the beets are received to be quickly and efficiently taken away by action of the elevator. Only shaft extensions 99 of the spiral grabrollers 66b protrude into the intake area 97, thereby minimizing interference with beet movement at this location.

Figure 19:
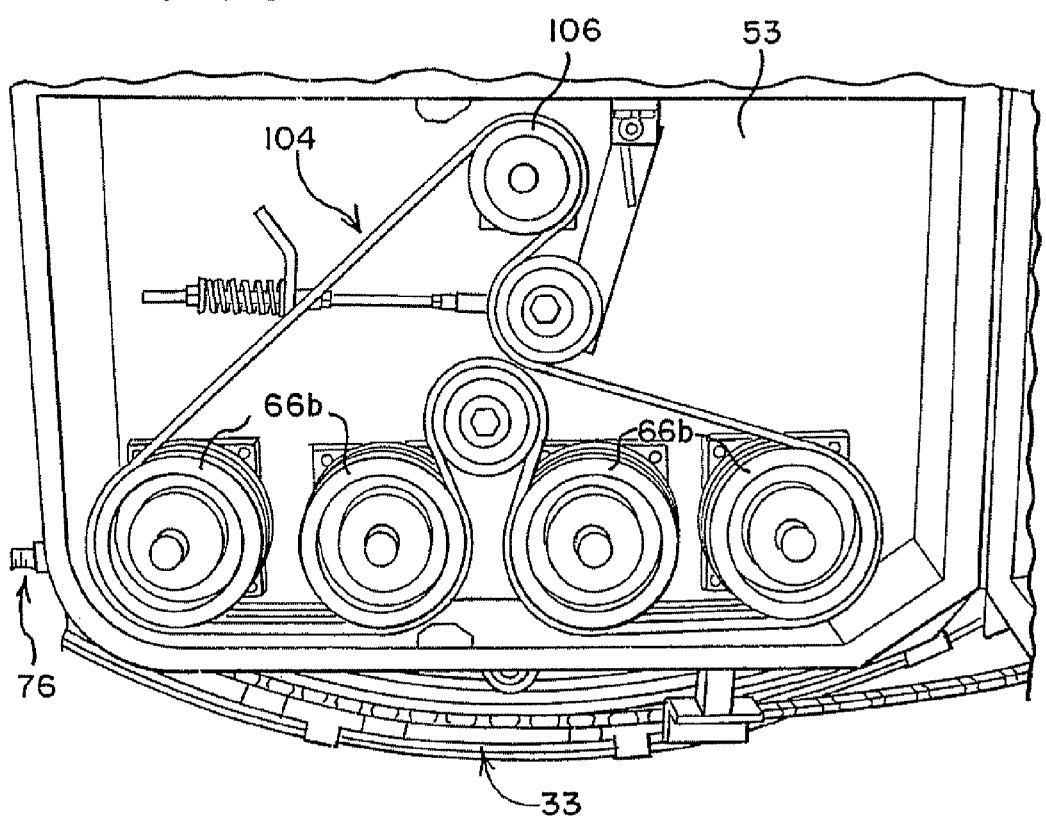
FIG. 19 is a detail view of an embodiment of the driven spiral grabroller drive system.

Another feature of the grabroller assembly 43 is the single V-belt drive system 102 for the smooth grabrollers 66a, which can be seen in FIG. 18. This feature allows the drive system 102 to be narrow and compact in an area of dirt and mud, which is an essential reason why this harvester can accommodate longitudinal grabrollers. A flap located above this drive system 102 prevents dirt and debris from falling into and clogging the system 102. As illustrated in FIG. 19, a separate V-belt drive system 104 which directly powers the spiral grabrollers 66b is coupled to a drive shaft 106 from the harvester's gearbox, disposed at a rear end of the processing assembly 32, and contained within a housing 53, providing a clean and safe design. It will be appreciated that the belt of the single V-belt drive system 102 in FIG. 18 is wrapped around the front ends of the grabrollers so as to transmit power from the spiral grabrollers 66b to the smooth grabrollers 66a. The illustrated belt also imparts to the smooth grabrollers 66a a rotation which is opposite that of the rotation of the spiral grabrollers 66b.

This grabroller assembly 43 preferably includes a single point adjustment with a centering bolt 76 at the front end, as illustrated in FIG. 18. Another centering bolt 76 is situated at the rear end of the grabroller assembly 43, as shown in FIG. 2. This single point adjustment allows the smooth rollers 66a to be simultaneously moved laterally, which varies the spacing between the paired grabrollers. Thus, the front and rear ends of all four smooth grabrollers 66a can be moved by a single adjustment. While the spacing between the paired rollers can be constant, having a wider gap at the rear than at the front reduces the required driving power and minimizes the risk of beet damage. Preferably, the gap at the rear end is as large as possible without allowing beets to fall from the harvester.

The grabrollers preferably are spring-cushioned or spring-loaded to allow rocks to fall through the gaps therebetween before reaching the elevator assembly 33, thus providing improved performance in rocky conditions. This feature also lessens the likelihood of beet damage.

With further reference to the elevator assembly 33, the ferris wheel embodiment 38 illustrated in FIG. 20 provides a lift of the beets after they drop off the end of the grabroller assembly 43 which is more gentle than other elevator arrangements. Preferably, the ferris wheel assembly is hydraulically driven and has a simplified arrangement with large ferris wheel rollers. It is typically driven at 11 rpm, although some conditions may require a slower speed of 9-10 rpm. A ferris wheel type of elevator assembly 33 is well known in the industry as a means of elevating beets for transport into an open-top holding tank 34.

The illustrated ferris wheel elevator assembly 38 is generally formed by several closely-spaced rails 108 that define a vertically extending ring. A conveyor lifts the beets from the bottom of the elevator to the top, while a retainer, which is not pictured, disposed within the ring provides a spring force that presses the beets against the inner surface of the rails 108 as they ascend. When a removal location is reached in an upper section of the ferris wheel elevator 38, the beets disengage from the ferris wheel and enter a conveyor 46 or bin for transport or storage. A stripper 110 at the top of the elevator 38 has discs that extend between the rails 108 and clear away any material that remains lodged therein after the beets fall into the tank conveyor 46.

Figure 21A:
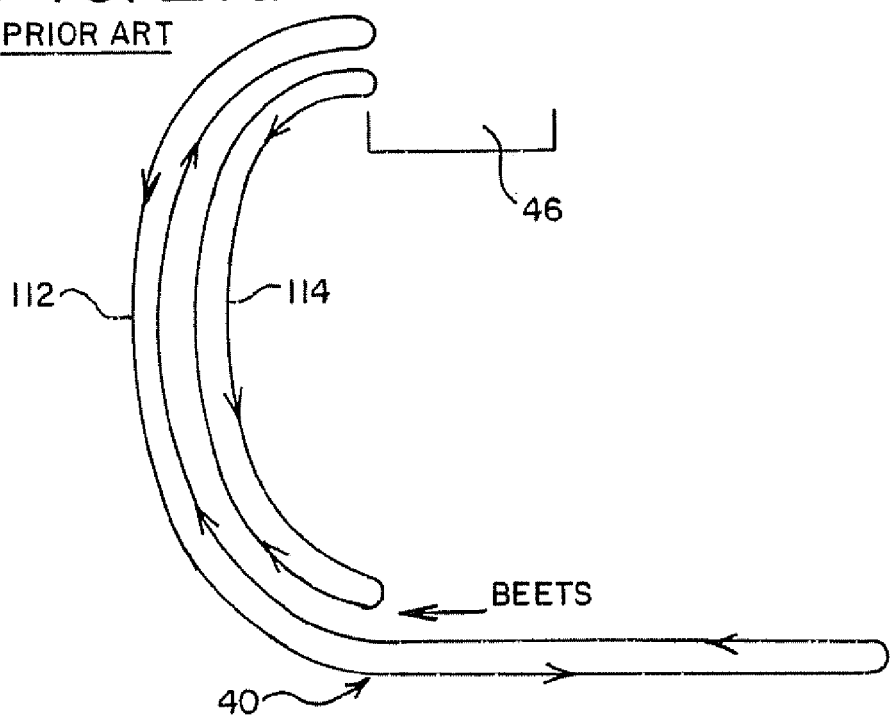
FIG. 21a is a schematic drawing of a prior art scrubber chain elevator assembly.
Figure 21B:
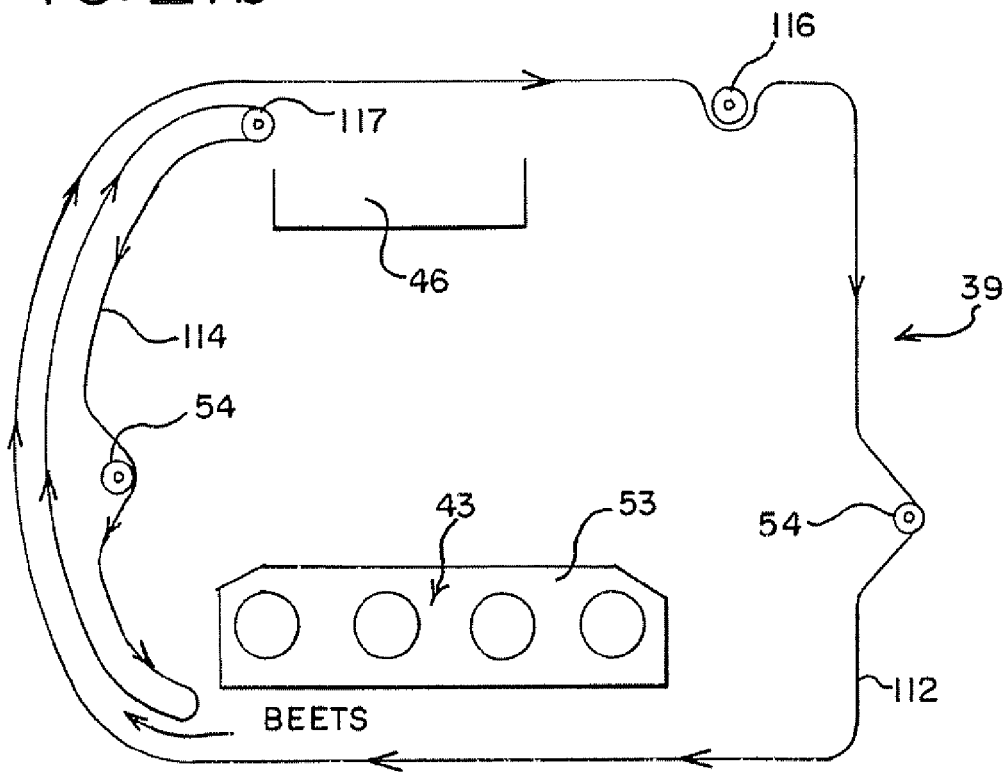
FIG. 21b is a schematic drawing of a preferred embodiment of the scrubber chain elevator assembly of according to this invention.
Figure 22:
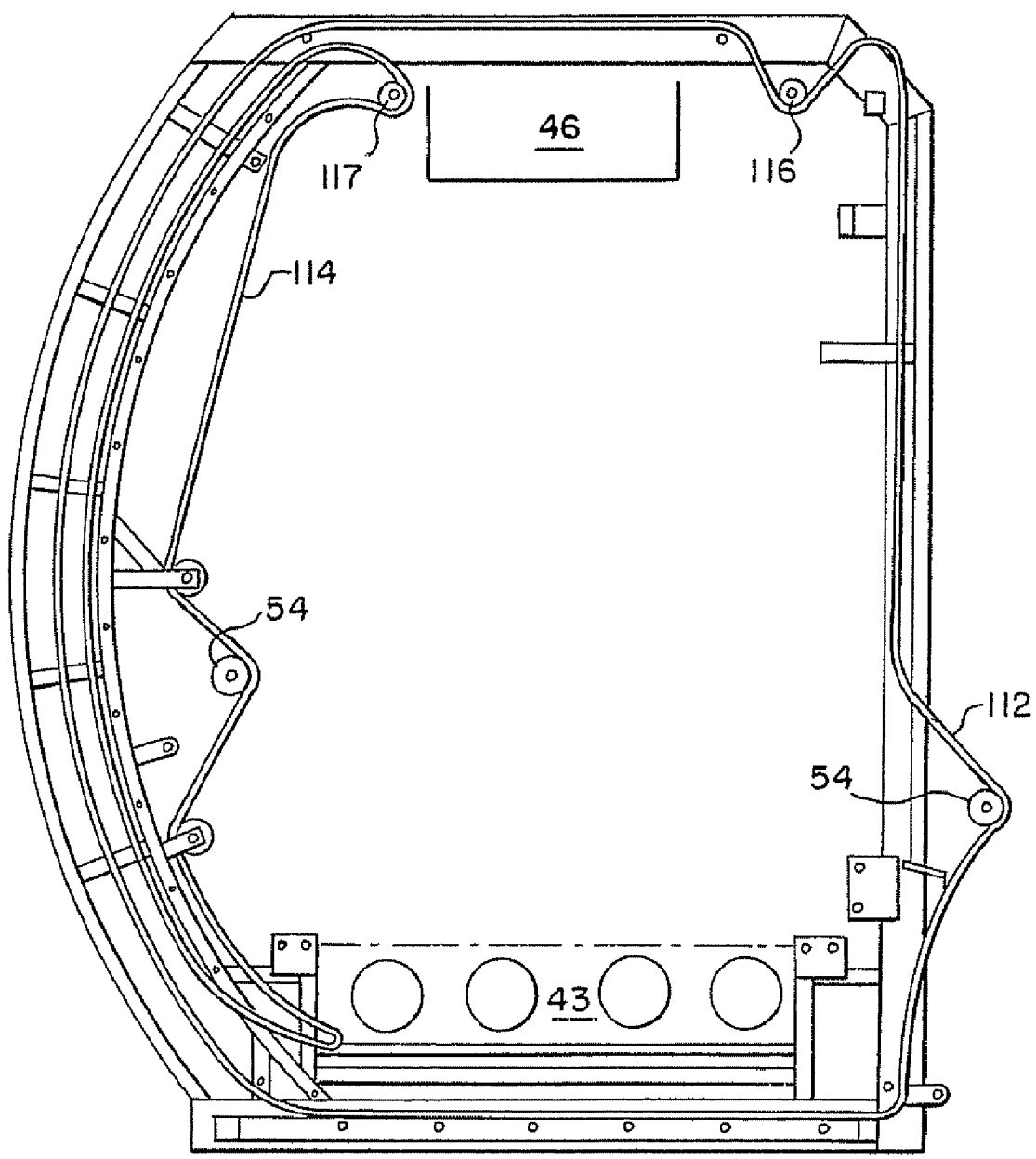
FIG. 22 is a rear elevational view of an embodiment of a harvester according to this invention with a scrubber chain elevator assembly.

FIG. 21b and FIG. 22 show details of an alternative elevator assembly, which is a scrubber chain elevator assembly 39 with an improved wraparound design. In general, a traditional scrubber chain elevator has outer and inner chains 112 and 114 which grip the beets and lift them for further transport. Operating the chains at different speeds effectively produces an additional cleaning stage by turning the beets and engaging or "scrubbing" them as they are elevated. In a typical scrubber chain elevator 40, the outer chain 112 doubles back upon itself, as shown in FIG. 21a. One problem with this design is that more clearance is required under the elevator assembly 33, which increases the height of the beet harvester or causes a ground clearance issue.

The improved scrubber chain elevator assembly 39 shown in FIG. 22 requires less ground clearance because the outer chain 112 traverses the bottom section once instead of twice. The scrubber chain elevator embodiment 39 incorporates inner and outer belted chains 114 and 112, 42 inches wide in a preferred embodiment, which provide simple circular chains with natural tensioning for holding beets as they are lifted. Tighteners 54 are provided for both the inner and outer chains 114 and 112 of the scrubber chain elevator assembly 39. The motor of the illustrated scrubber chain elevator assembly 39 is hydraulically driven by the self-contained hydraulic subsystem with a flow control valve for adjusting the speed of the elevator assembly. A crossover return chain 112 is provided in the illustrated embodiment for increased clearance and additional cleaning. An S-drive 116 is provided on the outer chain 112, with a headshaft drive 117 on the inner chain 114.

Each of the elevator assembly units 38 and 39 illustrated are modular and have mount features which allow one type of unit to be removed from a vertical frame structure 118, such as the illustrated tube at the rear portion of the processing assembly 32 and replaced by another type of unit. In the embodiment illustrated in FIG. 2, the elevator assembly 33 is mounted between the vertical frame structure 118 and a mount or rear bracket structure 119. The bracket structure 119 may be separate from the elevator assembly 33, as in FIG. 2, or it may be unitary to the elevator assembly 33, as in FIG. 4. A plurality of horizontal connectors 120 are preferably used to fasten the vertical frame structure 118 into general alignment with the rear bracket structure 119. Alternatively, if the rear bracket structure 119 is unitary to the elevator assembly 33, then the elevator assembly 33 may be directly fastened to the vertical frame structure 118. In a preferred embodiment, a lower portion of the rear bracket structure 119 is fastened to a rear portion of the frame of the processing assembly 32 in order to provide further support. The wraparound design of the scrubber chain 39, when used with the present beet harvester, allows the scrubber chain elevator assembly 39 to be easily mounted onto the same vertical frame structure 118 which is used to mount the circular ferris wheel elevator assembly 38. Simple adjustment to the hydraulic system will switch from the ferris wheel drive mode to the scrubber chain drive mode.

Figure 23:
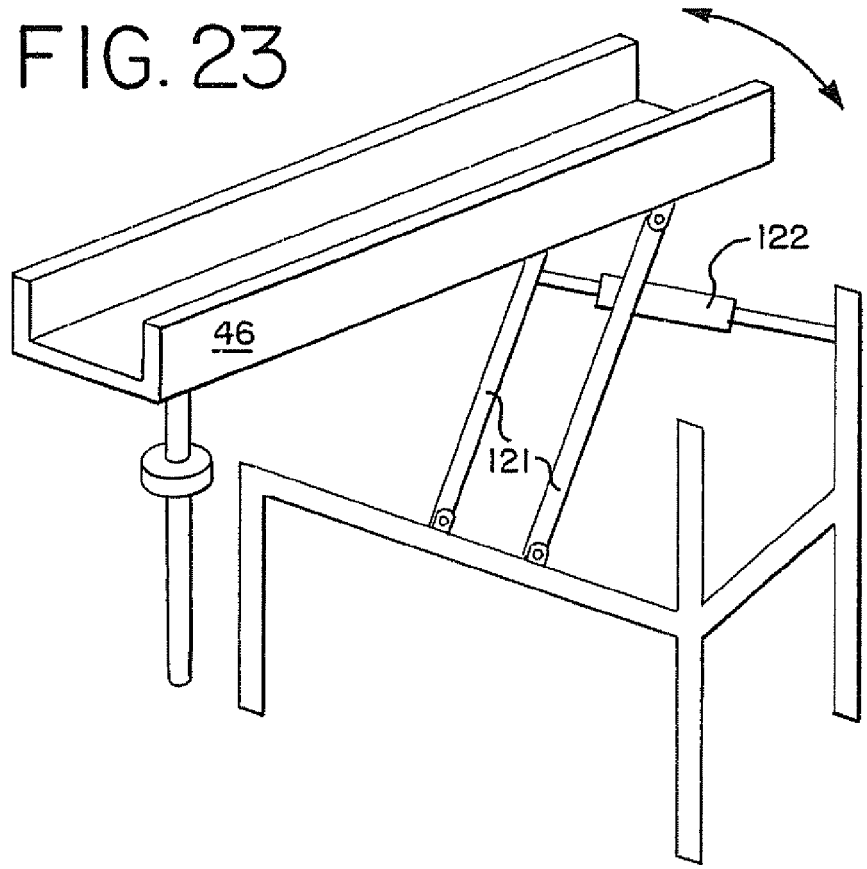
FIG. 23 is a schematic detail view of a preferred embodiment of the pivoting tank conveyor.

The tank conveyor 46 preferably includes a 42-inch-wide draper chain with one-inch risers. As illustrated in FIG. 22, its receiving end is positioned generally beneath the top of the elevator assembly 33, where the ferris wheel 38 or scrubber chain 39 ejects the beets. FIG. 23 shows a detailed view of the tank conveyor 46. The parallel arms 121 of the tank conveyor 46 have ball joints that can be used to lengthen the side supports of the tank conveyor 46, which varies the height of the discharge end. Preferably, the tank conveyor 46 also includes a pivot cylinder 122 which is powered by the harvester/tractor hydraulic subsystem. The pivot cylinder 122 moves the tank conveyor 46 while the ball joints on the parallel arms 121 support and allow the conveyor 46 to pivot so as to more evenly fill the holding tank 34. Prior art harvesters with stationary tank conveyors tend to create a large pile of beets within the holding tank because all of the beets are dumped into the same area. The pivoting tank conveyor feature creates an even distribution of beets throughout the holding tank 34.

Figure 25A:
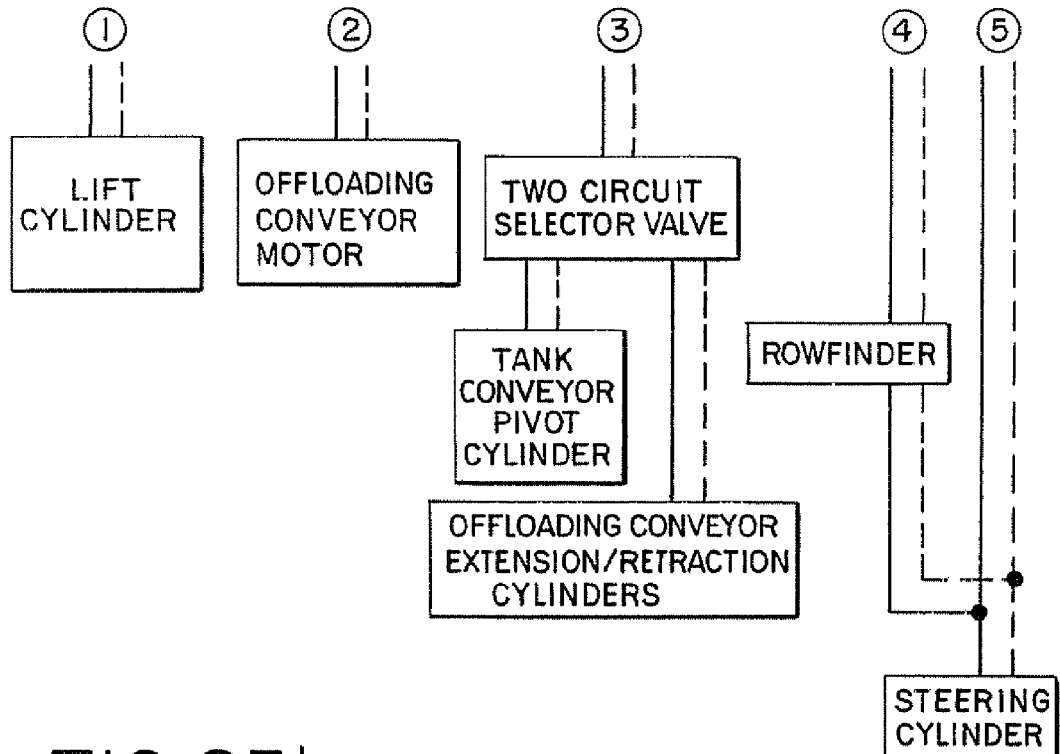
FIG. 25a is a schematic drawing of a preferred tank/harvester hydraulic subsystem of a hydraulic system suitable for a harvester according to this invention.

The holding tank 34 can provide a large capacity, for example four and one half-tons. It can be unloaded in one minute or less. The flow of the belted chain of this assembly is controlled from the cab of the tractor, such as through the hydraulic system as shown in FIG. 25a. The tank 34 is of the see-through type, providing good visibility. Additionally, as can be best seen in FIG. 3, the illustrated tank 34 is elevated and its bottom surface is inclined, both features which further improve visibility through the harvester.

The offloading conveyor 35 that is illustrated is a belted chain with one-inch risers, preferably 42 inches wide. In this arrangement, a portion of the offloading conveyor 35 serves as the bottom surface of the holding tank 34. Driving action can be carried out by a toothed sprocket and a chain drive whose motor is powered by the tractor/harvester hydraulic subsystem, shown schematically in FIG. 25a. The offloading conveyor 35 extends away from the harvester for unloading the beets from the holding tank 34 into an awaiting truck or other location. The illustrated conveyor 35 folds down and out of the way, behind the header assembly 31 for transport. In the extended unloading position, the discharge end of the conveyor 35 can be selectively adjusted, depending on the height of the awaiting truck. Typical adjustments can be between a height as low as eight feet and as high as thirteen feet. In addition, the illustrated offloading conveyor 35 can empty the holding tank 34 in less than one minute. For the wider header assemblies 31, an additional extension segment can be added in order to elongate the offloading conveyor 35 and allow the awaiting truck or wagon to be situated farther away.

A single axle having a pair of large diameter carrier wheels 36 is preferred as shown, for providing rolling ground engagement. Whereas previous tires generally had a diameter no greater than about 50 inches with approximately 500 square inches of ground contact area, the tires of the wheels 36 preferably have a 72-inch diameter with a ground contact area in the range of 900-1,000 square inches. Prior art harvesters with four or more carrier wheels generally use tires with an even smaller diameter and less ground contact area, which increases soil compaction and drag. In addition to a larger diameter, FIG. 5 shows that the illustrated carrier wheels 36 are positioned outboard of the frame of the processing assembly 32, which reduces the chance of developing rocking action and allows for better stability than if the carrier wheels 36 were positioned closer to the frame. The placement of the carrier wheels 36 illustrated in FIG. 5 improves flotation and reduces soil compaction. Steerable wheels can be used in order to further improve maneuverability, but are not essential to achieving improved performance.

This frame assembly and wheel arrangement provides less drag in muddy soil conditions, as the large diameter carrier wheels 36 can rotate, turn and more properly function in muddy conditions under which arrangements with smaller wheels would tend to skid. In addition, the preferred tires are reversible so as to allow easy adaptation to low spacing and transport. Hence, this large diameter tire and frame approach increases maneuverability in the field, improves performance in muddy conditions, and reduces compaction of soil.

FIG. 24 shows a preferred mechanical system for the harvester. The harvester's mechanical power comes from the power takeoff (PTO) of a tractor or other transport vehicle, by way of a constant velocity PTO driveshaft 47 of the harvester. The driveshaft 47 is coupled to a harvester gearbox, preferably located within the processing assembly 32, which in turn is coupled to the left and right sides of the header assembly 31 and to the rear of the processing assembly 32. A number of the illustrated harvester's components are mechanically driven, including: the left and right ends of the paddle shaft 51, the header roller drive system 90, the dual pump of the self-contained hydraulic subsystem, and the spiral grabroller belt drive system 104. As described above and illustrated in FIG. 18, mechanical power is transmitted to the smooth grabroller drive system 102 by the spiral grabrollers 66b.

Figure 25B:
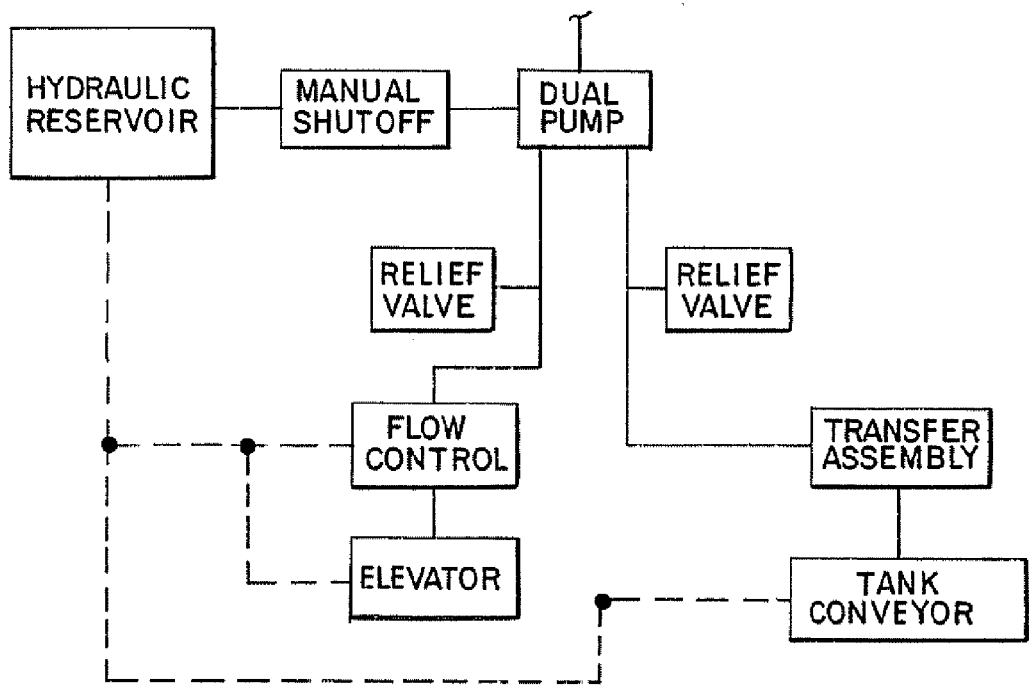
FIG. 25b is a schematic drawing of a preferred self-contained hydraulic subsystem of a hydraulic system suitable for a harvester according to this invention.

Turning now to the hydraulic system, this preferably includes two subsystems: one subsystem that is operated by the tractor's hydraulic system (the "tractor/harvester hydraulic subsystem") shown in FIG. 25a and the other a self-contained hydraulic subsystem shown in FIG. 25b. The illustrated tractor/harvester hydraulic subsystem consists of five hydraulic hose connections between the tractor and the harvester. It powers the following, when provided: the tongue lift cylinder, the rowfinder 80, an over-ride for the rowfinder, the pivot cylinder 122 of the tank conveyor, the motor of the offloading conveyor and the cylinders that raise and lower the discharge end of the offloading conveyor. The self-contained hydraulic subsystem is operated by a dual pump which is mechanically powered by a drive shaft 106 from the gearbox of the harvester. It powers the motor of the transfer assembly, the elevator motor, and the motor of the tank conveyor. It also preferably includes a flow control valve that can be adjusted to vary the speed of the rotating conveyor of the elevator assembly. In each of FIGS. 25a and 25b, which are hydraulic schematics, solid lines represent pressure lines and hashed lines represent return lines.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein.

The invention claimed is:

1. A method of harvesting and cleaning root crops comprising the steps of:
   lifting root crops from the ground with a mechanized root crop harvester;
   passing the root crops through transverse rollers as an early cleaning stage;
   passing the root crops from said transverse rollers onto a transfer assembly;
   dropping the root crops a controlled distance from the transfer assembly onto longitudinal rollers to knock dirt and debris from the root crops;

passing the root crops along the full length of the longitudinal rollers;

passing the root crops in a longitudinal direction from a distal end of said longitudinal rollers to an elevator assembly disposed at the distal end of said longitudinal rollers; and passing the root crops into a holding tank by way of the elevator assembly and a tank conveyor in root crop-receiving relationship with the elevator assembly.

2. The method of claim 1, wherein the elevator assembly comprises a scrubber chain elevator assembly having an outside chain and an inside chain and the method further comprises an additional cleaning stage wherein the outside chain and the inside chain of the scrubber chain elevator assembly circulate at different speeds to scrub the root crops.

\* \* \* \* \*